(12) United States Patent
Hersans et al.

(10) Patent No.: US 10,496,830 B2
(45) Date of Patent: Dec. 3, 2019

(54) MASS ENCRYPTION MANAGEMENT

(71) Applicant: salesforce.com, inc., San Francisco, CA (US)

(72) Inventors: Alexandre Hersans, Walnut Creek, CA (US); Je Woong Heo, Dublin, CA (US); Yunjia Zhou, San Mateo, CA (US); Aleksandr Alexander, Morgan Hill, CA (US); Assaf Ben Gur, Livermore, CA (US)

(73) Assignee: salesforce.com, inc., San Francisco, CA (US)

( * ) Notice: Subject to any disclaimer, the term of this patent is extended or adjusted under 35 U.S.C. 154(b) by 99 days.

(21) Appl. No.: 15/782,087

(22) Filed: Oct. 12, 2017

(65) Prior Publication Data

US 2019/0114438 A1 Apr. 18, 2019

(51) Int. Cl.
| | | |
|---|---|---|
| *G06F 21/00* | (2013.01) | |
| *G06F 21/60* | (2013.01) | |
| *G06F 21/62* | (2013.01) | |
| *G06F 3/06* | (2006.01) | |
| *G06F 12/14* | (2006.01) | |
| *G06F 16/27* | (2019.01) | |
| *H04L 9/08* | (2006.01) | |

(52) U.S. Cl.
CPC .......... *G06F 21/602* (2013.01); *G06F 3/0623* (2013.01); *G06F 12/1408* (2013.01); *G06F 16/278* (2019.01); *G06F 21/6218* (2013.01); *G06F 2221/2107* (2013.01); *H04L 9/0822* (2013.01)

(58) Field of Classification Search
CPC .. G06F 21/602; G06F 3/0623; G06F 12/1408; G06F 21/6218; G06F 2221/2107; G06F 16/278; H04L 9/0822
See application file for complete search history.

(56) References Cited

U.S. PATENT DOCUMENTS

| | | | |
|---|---|---|---|
| 2007/0058801 A1* | 3/2007 | Plotkin | ................... H04L 9/088 380/28 |
| 2008/0320319 A1* | 12/2008 | Muller | ................ G06F 21/6209 713/193 |
| 2012/0173882 A1* | 7/2012 | Horn | ....................... G06F 21/78 713/189 |
| 2017/0262645 A1* | 9/2017 | Gupta | ................. G06F 21/6218 |

* cited by examiner

*Primary Examiner* — Yogesh Paliwal
(74) *Attorney, Agent, or Firm* — Holland & Hart LLP

(57) ABSTRACT

Methods, systems, and devices for mass encryption management are described. In some database systems, users may select encryption settings for storing data records at rest. A database may receive a request to perform an encryption process on multiple data records corresponding to a user, for example, based on a user input or a change in encryption settings. A database server may partition the data records for encryption (e.g., encryption, decryption, key rotation, or scheme modification) into one or more data record groups of similar sizes, and may perform the encryption process on one record group at a time (e.g., to reduce overhead in the system). The database server may additionally support restricting user access to the data records being actively processed, estimating resources needed for the processing, determining data record encryption statuses to be displayed by a user device, or some combination of these features.

19 Claims, 13 Drawing Sheets

Encryption Statistics

| Object | Data Encrypted | Uses Active Key |
|---|---|---|
| Object 505-a | Value 510-a | Value 515-a |
| Object 505-b | Value 510-b | Value 515-b |
| Object 505-c | Value 510-c | Value 515-c |

Object 505-b

| Field | API Name | Encrypted Records | Unencrypted Records | Mixed Secret | Mixed Scheme |
|---|---|---|---|---|---|
| Field 520-a | Name 525-a | Value 530-a | Value 535-a | Y/N 540-a | Y/N 545-a |
| Field 520-b | Name 525-b | Value 530-b | Value 535-b | Y/N 540-b | Y/N 545-b |
| Field 520-c | Name 525-c | Value 530-c | Value 535-c | Y/N 540-c | Y/N 545-b |
| Field 520-d | Name 525-d | Value 530-d | Value 535-d | Y/N 540-d | Y/N 545-d |

<< < Pages > >>

Status Field 550

Gather Statistics 555

MASS ENCRYPTION MANAGEMENT

FIELD OF TECHNOLOGY

The present disclosure relates generally to database systems and data processing, and more specifically to mass encryption management.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may be supported by a database system. Within the database system, one or more databases may support storing encrypted data records at rest. An owner of the data (e.g., a tenant in a multi-tenant database system) may select settings for a data storage policy, including whether to encrypt certain data records. However, the database system may already contain a large number (e.g., thousands, hundreds of thousands, millions, etc.) of data records for that tenant stored according to a previous data storage policy.

BRIEF DESCRIPTION OF THE DRAWINGS

FIG. 5 illustrates an example of an encryption dashboard that supports mass encryption management in accordance with aspects of the present disclosure.

DETAILED DESCRIPTION

Figure 1:
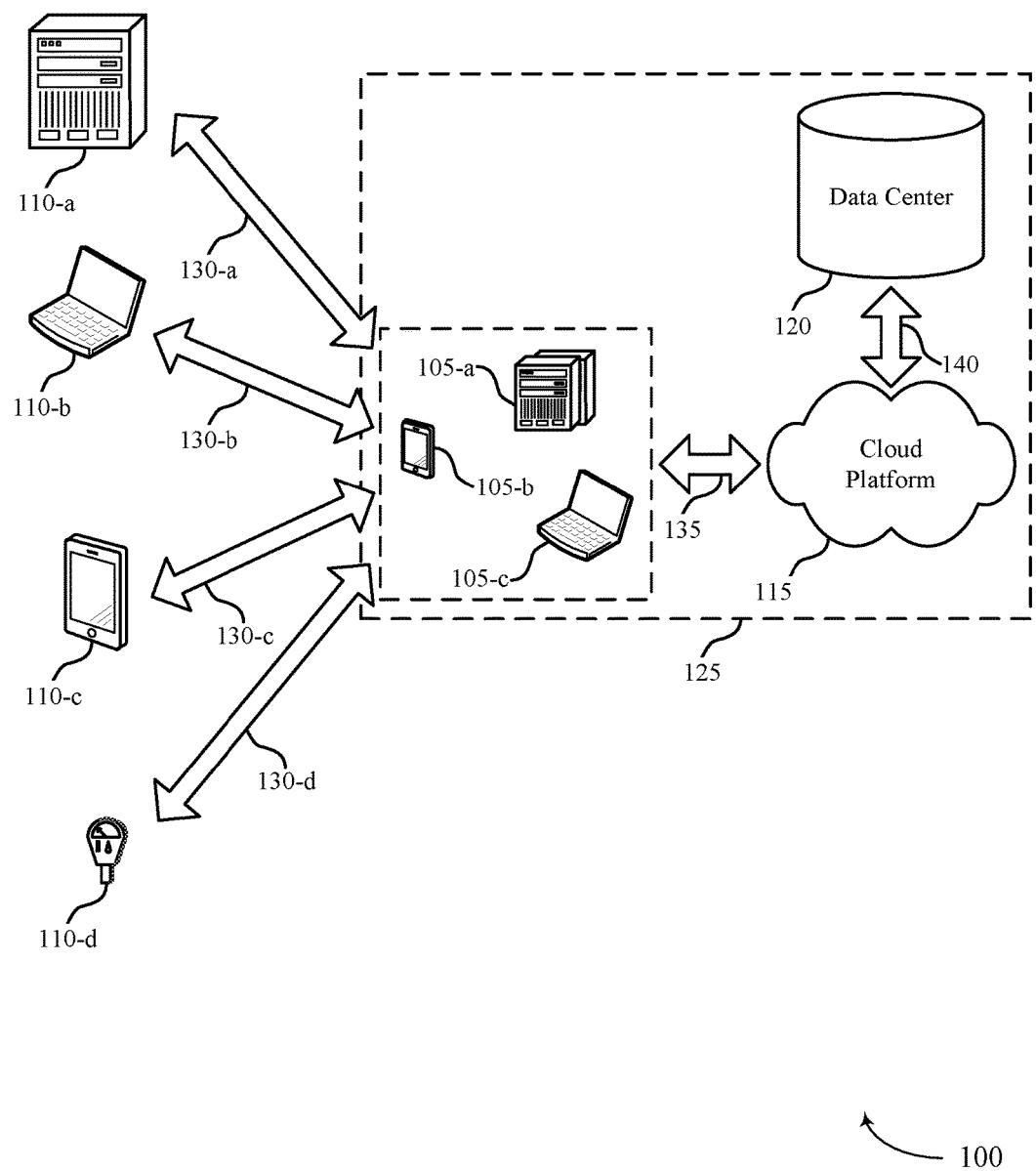
FIG. 1 illustrates an example of a system for encryption management that supports mass encryption management in accordance with aspects of the present disclosure.

Some database systems may support encryption of data records at rest. To increase security of stored information, one or more databases may store data records as ciphertext, rather than plaintext. In some cases, in a multi-tenant database system, each tenant may select the data records to encrypt, and may further select an encryption key or encryption scheme for generating the ciphertext. Different tenants may select different encryption settings, and each tenant may modify the tenant-specific encryption settings (e.g., to meet updated security protocols).

A database may receive an indication of a change to the encryption settings for a tenant. In one aspect, the tenant may select a data record, data field, data object, or data object type for encryption or decryption. In a second aspect, the tenant may change an encryption scheme (e.g., between probabilistic and deterministic encryption schemes) for multiple data records. In a third aspect, the tenant or the database may switch active encryption keys for multiple data records stored in the database. In any of these cases, a database server (e.g., a single server or a server cluster) may identify the data records affected by the change in encryption settings, and may partition the identified data records into one or more data record groups. Each data record group may have a similar size (e.g., within a threshold size range) based on a default group size, a tenant-specific size, available memory or processing power, or some other parameter related to handling batch encryption jobs on these record groups.

For each data record group, the database server may perform a mass encryption estimation process to determine relevant metrics associated with the mass encryption process. The database server may send an indication of the estimation results to a user device (e.g., in an email message). Additionally or alternatively, the database server may determine encryption statuses (e.g., which data records are encrypted using which encryption keys or schemes) for data stored at the database for a tenant, and may send the encryption status information to a user device. The user device may display this encryption status information in an encryption dashboard.

In response to the change in encryption settings, the database server may perform an encryption process on the set of data record groups. The encryption process may be an example of a mass encryption process, a mass decryption process, a mass key rotation process, a mass encryption scheme modification process, or some combination of these processes. The database server may retrieve, from a database, the data records in the first record group for processing, and may temporarily restrict user access to these data records. The database server may update the data records of the first record group (e.g., updating the encryption or decrypting the data records) in a background job, while continuing to support other database processes. For example, the database server may maintain user access to other data records not currently being updated, including data records marked for encryption processes but contained in a different data record group. Once the data records of the first record group are updated, the database server may store the updated versions of the data records in the database, and may return user access to these records. The database server may then proceed to encrypt, decrypt, or re-encrypt a second record group, and may continue this process until each record group is updated with the latest encryption settings.

Aspects of the disclosure are initially described in the context of an environment supporting an on-demand database service. Further aspects of the disclosure are described with respect to processes, architectures, and user interfaces for mass encryption. Aspects of the disclosure are further illustrated by and described with reference to apparatus diagrams, system diagrams, and flowcharts that relate to mass encryption management.

FIG. 1 illustrates an example of a system 100 for cloud computing that supports mass encryption management in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, data center 120 may include one or more databases that support encryption at rest for stored data records. A cloud client 105 may select an encryption policy for data stored in the database for that cloud client 105. For example, in some cases, the cloud client 105 may select data records to be stored as plaintext or ciphertext, select an encryption key (e.g., select to rotate an encryption key based on a trigger or periodicity), or select an encryption scheme. A database in data center 120 may store data records according to the selected encryption policy.

However, if the cloud client 105 switches from a first encryption policy to a second encryption policy (e.g., if the cloud client 105 modifies any of the above listed parameters for storing data records in the database), the database may contain previously stored data according to a now outdated policy. In order to keep data records for the cloud client 105 secure and up to date, data center 120 may perform a mass encryption process on the data records for the cloud client 105. A database server of the data center 120 may search database storage for data records to update based on the new encryption policy, and may partition the identified data records into manageable record groups for updating. The database server may estimate resources (e.g., time, memory, power, etc.) needed to perform the mass encryption process on each record group or the set of record groups, and may send an indication of the estimation to the cloud client 105. Additionally or alternatively, the cloud client 105 may display an encryption dashboard in a user interface, where the dashboard indicates the encryption status for data records or object types associated with a tenant. The database server may perform the encryption process—which may include encrypting data, decrypting data, rotating an encryption key, or changing an encryption scheme—on one record group at a time as a background job. The database server may restrict user access to data records within the record group currently being processed, but may maintain user access to other data records stored in the database. In this way, data center 120 may provide user visibility and continuity of service while mass encrypting data records stored in the data center 120.

Figure 2:
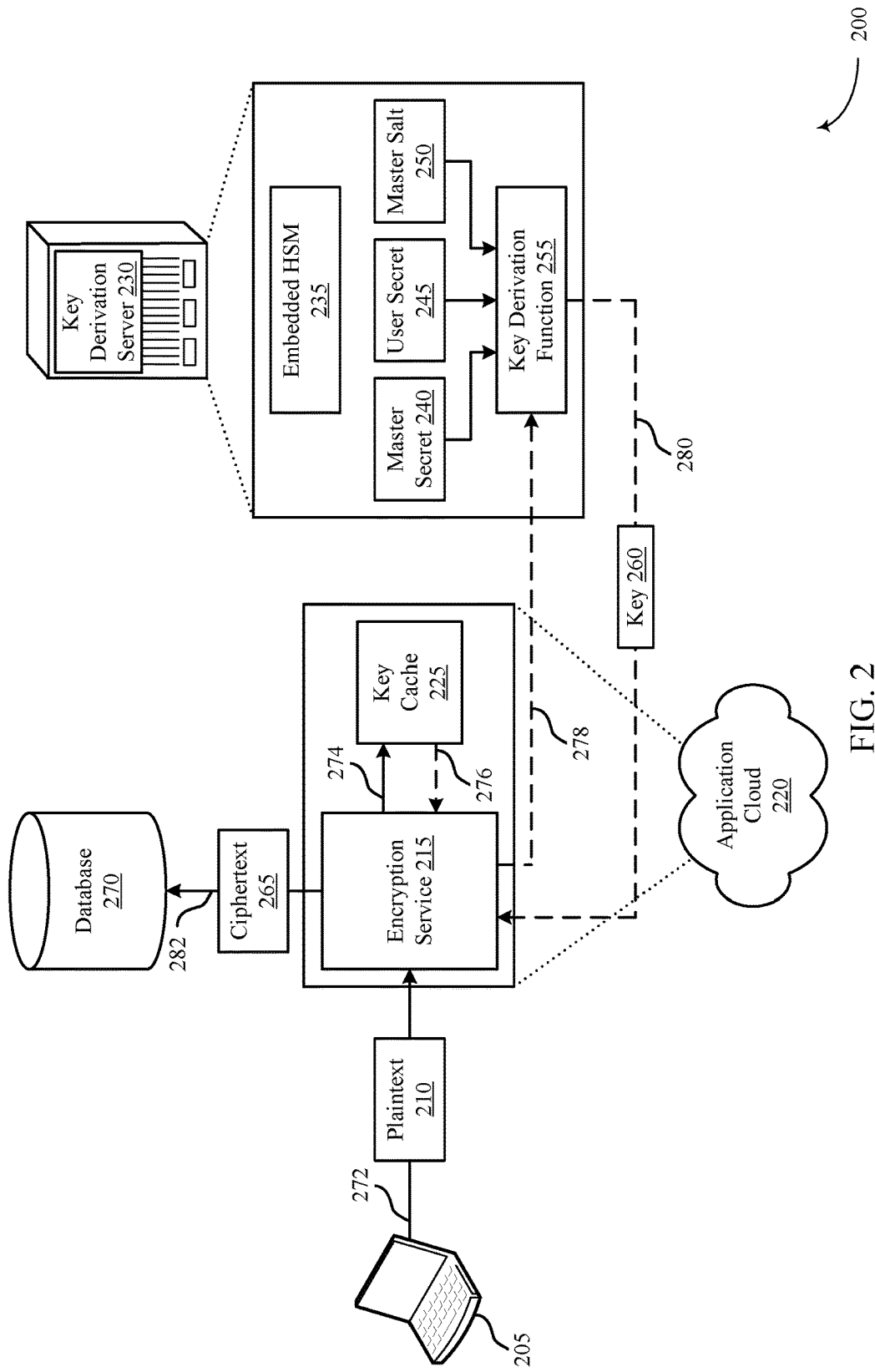
FIG. 2 illustrates an example of an encryption process that supports mass encryption management in accordance with aspects of the present disclosure.

FIG. 2 illustrates an example of an encryption process 200 that supports mass encryption management in accordance with various aspects of the present disclosure. Encryption process 200 may be initiated by a user device 205, which may be an example of a cloud client 105 or a contact 110 as described with reference to FIG. 1. The user device 205 may send a data object to a database 270 to be stored. In some cases, the data object may include one or more plaintext data fields that are designated for encryption. The plaintext 210 may be encrypted in an application cloud 220 based on a key 260 generated by a key derivation server 230. In some case, the database 270 and the key derivation server 230 may be components of a data center 120 as described with reference to FIG. 1. Encryption process 200 may convert the plaintext 210 into ciphertext 265, and may store the ciphertext 265 at the database 270.

A database 270 may implement encryption to block users without a certain authorization level from viewing data. Encryption may provide security for data at rest (i.e., data stored at the database 270), and may not provide security for data being transmitted or received. In some cases, the database 270 may additionally implement security for data being transmitted or received, such as transport layer security. In some cases, a user may turn encryption on or off, and may specify the data for encryption. Some examples of data a user may select to encrypt include personally identifiable information (PII), sensitive, confidential, or proprietary data, or any other data that the user wants to stop unauthorized users from accessing in the database 270. In some cases, the encrypted data may be a data field within a data object, a data file, or an attachment.

In some cases, encryption process 200 may incur a tradeoff between data security and functionality. For example, a user may run functions on data objects in the application cloud 220. However, some of these functions may not be designed to run on encrypted data. Encryption process 200 may be an example of probabilistic encryption (i.e., non-deterministic encryption, such as strong symmetric non-deterministic encryption), or may be an example of deterministic encryption. In some cases, probabilistic encryption may support less functionality than deterministic encryption, but may provide better data security. In one example, encryption process 200 may be probabilistic encryption utilizing the Advanced Encryption Standard (AES) with 256-bit keys. Encryption process 200 may additionally use cipher block chaining (CBC), public key cryptography standards (PKCS) for padding (e.g., PKCS #5), a random initialization vector (IV), or any combination thereof.

At 272, a user device 205 may send a data object to database 270 for storage. The data object may first be sent to the application cloud 220, which may include encryption service 215 and key cache 225. In some cases, the encryption service 215 and key cache 225 may be components of a database server, which may be a component of a data center 120, as described with reference to FIG. 1. The data object sent to the encryption service 215 may include a set of data fields (e.g., an organization identifier field, a name field, a phone number field, a price field, etc.). In some cases, one or more of the data fields may be designated for encryption. For example, a user may select to encrypt the name field. In some cases, the user may additionally select an encryption scheme (e.g., deterministic encryption or probabilistic encryption) for the data field. When the data object is received at the encryption service 215, a runtime engine may determine whether the data object contains any data designated for encryption. The encryption service 215 may identify the name field, and may initiate encryption of the plaintext 210 corresponding to the name field of the data object.

At 274, the encryption service 215 may request an encryption key 260 from the key cache 225. An encryption key 260 that was recently used may be stored in the key cache 225, which may be an example of an application server cache. For example, when the encryption service 215 encrypts data using an encryption key 260, the encryption service 215 may store the encryption key 260 in the key cache 225. The encryption key 260 may not persist in the key cache 225. For example, the key cache 225 may flush its storage or remove the encryption key 260 based on a cache replacement algorithm (e.g., a least recently used (LRU) cache algorithm). The key cache 225 may identify whether it contains the active encryption key 260 corresponding to the data field to be encrypted (e.g., based on metadata associated with the data object or the data field). If the key cache 225 identifies the encryption key 260, the key cache 225 may send the encryption key 260 to the encryption service 215 at 276. Otherwise, the key cache 225 may send an indication to the encryption service 215 that the key cache 225 does not have the encryption key 260. In some cases, the key cache 225 may not send anything to the encryption service 215, and the encryption service 215 may determine to derive the encryption key 260 based on not receiving a response from the key cache 225.

At 278, the encryption service 215 may send a derivation request to a key derivation server 230 based on not receiving the encryption key 260 from the key cache 225. The key derivation server 230 may include one or more embedded hardware security modules (HSMs) 235, a master secret 240, a user secret 245, and a master salt 250. The embedded HSMs 235 may be examples of computing devices used to secure and manage any encryption keys 260. The master secret 240 and the master salt 250 may be generated periodically or aperiodically (e.g., at the start of each new software release). The master secret 240 may be generated based on a master HSM, which may be physically located at a different location than the key derivation server 230. The user secret 245 may be input by a user or generated on demand based on the embedded HSMs 235. The master secret 240, the user secret 245, the master salt 250, or any combination of these may be input into a key derivation function 255 (e.g., a password-based key derivation function 2 (PBKDF2)). Based on receiving the derivation request, and the master secret 240, the user secret 245, the master salt 250, or a combination of these, the key derivation function 255 may generate an encryption key 260. At 280, the key derivation server 230 may send the encryption key 260, which itself may be encrypted, to the encryption service 215 or the key cache 225.

The encryption service 215 may receive the encryption key 260 (e.g., either from the key cache 225 or the key derivation server 230) and may use the encryption key 260, along with a random IV to encrypt the plaintext 210 into ciphertext 265. The encryption service 215 may then store the encryption key 260 in the key cache 225. At 282, the encryption service may store the data object, including the ciphertext 265 for the encrypted data field, in the database 270, along with metadata associated with the data field. The associated metadata may include an indication that the data field contains ciphertext 265, an identifier of the user secret 245 used to derive the encryption key 260, and the random IV used for encryption.

In some cases, data already stored in the database 270 may be selected for encryption, re-encryption, or decryption. For example, a user may select to turn encryption on for a data field, where one or more data objects stored in the database 270 contain the data field. In other examples, the user or the database may rotate an encryption key 260 (e.g., generate a new active encryption key 260, and archive or revoke an existing encryption key 260) or switch an encryption scheme. In these cases, the database 270 may send the data objects or the plaintext 210 stored in the data field to the application cloud 220 or a database server for encryption, re-encryption, or decryption. The database 270 may send batches of data objects or data fields (e.g., in portioned data chunks or record groups) for encryption, re-encryption, or decryption in order to reduce overhead associated with the encryption process at any one time. These encryption processes may run as a background job, and the database 270 or application cloud 220 may limit the processing power or memory allocated for these encryption processes. In some cases, encryption may occur in the database 270 or a data center rather than in the application cloud 220.

Figure 3:
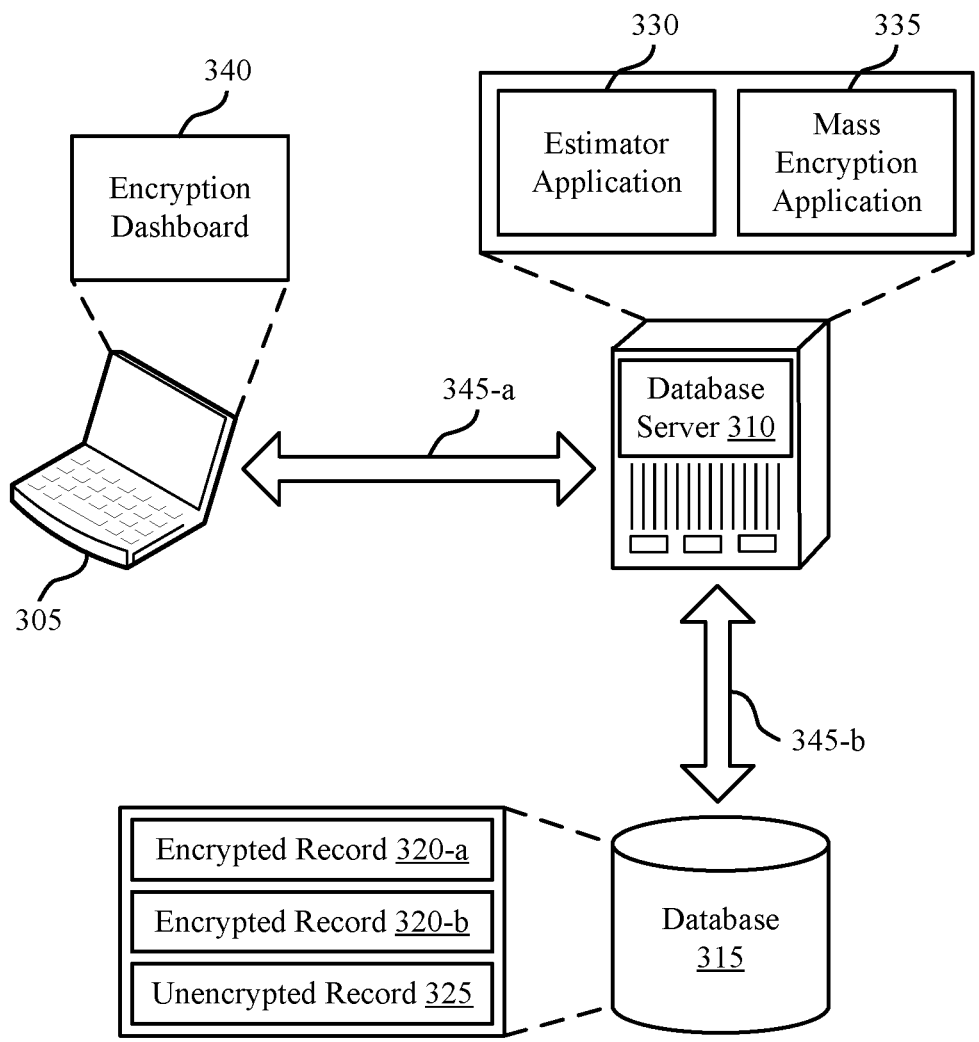
FIG. 3 illustrates an example of a system architecture that supports mass encryption management in accordance with aspects of the present disclosure.

FIG. 3 illustrates an example of a system architecture 300 that supports mass encryption management in accordance with various aspects of the present disclosure. The system architecture 300 may include a user device 305, a database server 310, and a database 315. The database server 310 and the database 315 may be examples of components of a data center, such as data center 120 discussed in FIG. 1. The database 315 may store multiple encrypted records 320, unencrypted records 325, or some combination of these. The database server 310 may determine encryption statuses for the records stored at database 315 using estimator application 330, and may further estimate resources for performing encryption processes. The database server 310 may perform the encryption processes using mass encryption application 335. The user device 305 may display an encryption dashboard 340 including information on data records and encryption processes in a user interface. The user device 305 may communicate with the database server 310 over communication link 345-*a*, and the database server 310 may communicate with the database 315 over communication link 345-*b*. In the system architecture 300, the database server 310 may handle mass encryption processes for the database 315.

The database 315 or the database server 310 may include functionality for encryption-aware "lazy" encryption. The database 315 or database server 310 may track the state of data records stored in the database 315 in order to determine support for certain functions and to perform "lazy" encryption. For example, the database 315 may store data objects, where each data object contains one or more fields. Each field of a data object may specify a parameter or value for that data object. In one specific example, an "Account" data object may include a "Name" field defining the name of the account. The database 315 may support encryption on an object-by-object basis, a field-by-field basis, or both. That is, in the above example, if encryption is enabled for an account, all fields of that account may be encrypted. Similarly, if encryption is enabled for the "Name" field, the name for each account may be encrypted. Alternatively, encryption may be enable for a specific field of a specific account.

To keep track of encrypted fields, data objects, or both, database 315 may store indications of the state of data (e.g., within metadata). For example, for a field, the database 315 may store a field attribute entity indicating information about the field. Within the field attribute entity, the database 315 may set one or more flags of an encryption option bit vector field based on the state of data within the field. If a first field contains encrypted records 320 and unencrypted records 325, the database 315 may indicate a "might have mixed data" field (e.g., by setting a "might have mixed data" bit to a 1, rather than a 0). A set "might have mixed data" bit may correspond to a mix of plaintext and ciphertext stored for that field in the database 315. Similarly, if the first field contains encrypted record 320-*a* encrypted using a first encryption key, and encrypted record 320-*b* encrypted using a second encryption key, the database 315 may indicate a "might have data with old key" field, if either the first encryption key or the second encryption key is not an active encryption key.

Encryption tracking bits, such as these indications in the encryption option bit vector field, may be sent to the database server 310 or the user device 305. For example, the encryption tracking bits may be accessible in a field or object encryption information interface in an information layer of the universal data dictionary (UDD). In some cases, the database 315 may implement a metadata-driven architecture to handle reliable tracking of encryption settings. At runtime, a user device 305 may request this encryption tracking information (e.g., to modify, display, or determine a value for this information). In some cases, certain applications or processes performed at the user device 305, database server 310, or database 315 may not support encryption (e.g., filtering, sorting, etc.). Such applications or processes may first check the encryption tracking bits before executing, and may refrain from executing if the corresponding data is marked as including mixed data, or marked as including encrypted data. Using these flags may improve reliability of the system over checking whether encryption is turned on for a field or object, as fields or objects with encryption turned off may still contain encrypted records 320 (e.g., if a mass decryption process has not yet occurred).

In some cases, the UDD may support both regular field objects and corresponding encrypted field objects. The field objects may encapsulate logic for a field according to the field object type, and regular and encrypted field objects for a same field may support different logic or parameters. The UDD may detect if a field is encrypted (e.g., based on the encryption tracking bits), and may select the field object—and corresponding set of logic or parameters—based on the encryption status. For example, if an account phone field is encrypted at rest, each time the UDD loads an account data object, the UDD may instantiate an encrypted at rest version of the phone field class, instead of a regular or default version of the phone field class.

The logic for encrypted field objects or classes may include encryption and decryption logic, including support for decryption on the fly. A database server 310 may contain the functionality for encrypted field objects, and may decrypt or re-encrypt records as the records leave or enter the database 315. Encrypted records 320 may be decrypted at the database server 310 for use in applications or procedures at the database server 310 or a user device 305. Conversely, data records may be encrypted at the database server 310 upon a save command to the database 315 if the database server 310 identifies that the data record is marked for encryption. Furthermore, the encrypted field object logic may include rules for identifying encrypted records 320 encrypted using an archived key, and may re-encrypt the record using an active encryption key before returning the data record to the database 315. These encryption keys may be examples of tenant-specific encryption keys in a multi-tenant database system.

Encrypting, decrypting, or re-encrypting a data record may not alter the plaintext contents of the data record. For example, rotating an encryption key from an archived version to an active version may update the ciphertext for a field, but may not modify the plaintext associated with the ciphertext. In some cases, the UDD may track whether the plaintext value of a field is modified (e.g., using an "is field changed" flag or bit). The UDD may indicate that a field is not changed, even if the ciphertext changes, when the plaintext value remains the same. Encryption processes that do not affect the plaintext value of a field may not generate an entry in a field history log or a field track changes table.

"Lazy" encryption may update stored data records with the latest encryption settings in an aperiodic process triggered when data records are retrieved from the database 315. However, a tenant or user may desire or require all of the data records stored in the database 315 to be updated in a scalable procedure with the latest settings. In this way, a user may reliable determine that all tenant-specific data records at the database 315 are synchronized with updated encryption settings. In such cases, the system architecture 300 may support mass encryption, mass decryption, mass re-keying, mass encryption scheme changes, or any combination of these processes for data records stored in the database 315. All of these processes may be generically referred to as encryption processes.

Mass encryption may refer to the process of encrypting multiple data records (e.g., unencrypted records 325 stored at the database 315) when encryption is turned on for a specific field, data object, tenant, or some combination of these. Mass decryption may refer to the process of decrypting multiple data records (e.g., encrypted records 320 stored at the database 315) when encryption is turned off for a specific field, data object, tenant, or some combination of these. In both cases, the data may be marked as mixed data during the process when some data records are updated (e.g., either encrypted or decrypted) while other records have not yet been updated.

Mass re-keying may also be referred to as a mass key rotation process, and may refer to updating encrypted records 320 with a new encryption key. For example, the database server 310 may identify a new active key associated with data records for a tenant. The new active key may be based on a periodic or scheduled encryption key update or a key rotation command received from a user device 305. In some cases, the new encryption key may correspond to a new tenant secret. The database server 310 may update all data records (e.g., generate a new ciphertext based on the plaintext and the new active encryption key) stored for the tenant in the database 315, either automatically or based on a selected policy for the tenant. For example, the database 315 may store encrypted records 320 for the tenant using a first encryption key. Following the key rotation, the database server 310 may identify records encrypted using an old encryption key, and may update the identified records with the new encryption key. For example, the database server may update encrypted record 320-a to be encrypted using the active encryption key. While some of the data records are encrypted using the active key, and other records are encrypted using an archived key, the field or data objects may be marked as containing data using an old key. The mass re-keying may allow the database 315 to update all records so that an archived key is no longer in use, and the database 315 may delete the tenant secret used to derive the archived encryption key. This may improve the security of the system, as the database 315 may not store previously used tenant secrets, or one or more archived keys, for extended periods of time.

A mass encryption scheme change may refer to switching a type of encryption used by a tenant. For example, the database 315 may support probabilistic encryption and deterministic encryption. In some cases, a tenant may select whether to implement probabilistic or deterministic encryption for the data records in the database 315. If the tenant selects to switch from one encryption scheme to another, the database server 310 may re-encrypt the data records to use the updated scheme (e.g., generate new ciphertext based on the new encryption scheme and the same plaintext value). While the database server 310 performs the encryption scheme change, different encrypted records 320 in the database 315 may be encrypted using different encryption schemes, and the database 310 may indicate this with a "might have mixed schemes" marker.

To handle the above encryption processes in a database 315 storing large amounts of data (e.g., hundreds of thousands of data records), the database server 310 may implement a background job. The database server 310 may perform a data chunking process to partition the data records marked for encryption into separate groups. The database server 310 may run the background job in parallel to other processes on a group of the data records. Separating the job into smaller portions may limit the memory and processing resources used to perform the job at a single moment in time, which may free up processing power to perform other operations. In this way, the encryption processes may run in the background using allocated resources, while other processes may continue to run on the database server 310 or other worker servers. User device 305 may continue to interact with the database 315 during mass encryption, decryption, re-keying, or scheme changes based on this data chunking and parallelization.

The database server 310 may support encryption processes for multiple types of data records. In some cases, the database server 310 may perform different functions based on the data record type to handle encryption processes for the different record types. These data record types may include standard variables, characters, dates, historical data, or large objects (e.g., character large objects (CLOBs) or binary large objects (BLOBs)), custom variables, characters, dates, historical data, or large objects, attachments, content files, or any other data record types that may be stored in the database 315.

In some database systems, the database server 310 and database 315 may leverage the "lazy" encryption functionality to perform the encryption processes. For example, the database server 310 may load each data record in a data chunk, and simply save the data records back to the database 315 without any modification to the plaintext. In this way, the database server 310, utilizing the UDD, may automatically update the encryption (e.g., re-encrypt or decrypt each of the data records) during the save based on the "lazy" encryption procedure. This procedure may reuse a same code path for mass encrypting data and encrypting data based on a trigger (e.g., loading a data record at the database server 310). However, such a solution to mass encryption may introduce other problems within the system.

Using the UDD for a background mass encryption job may lead to inherent issues within the database system. For example, loading and re-saving data records to update encryption without any other modifications may not be possible for a database server 310. If field parameters or schema for a data record are modified, the database server 310 may not be able to re-save a data record without modifying the content of the record. For example, marking a field as required or changing a maximum length of a field may invalidate an existing data record stored in the database 315, so the database server 310 may need to update the contents of the field before re-saving back to the database 315. In some cases, leveraging the UDD and "lazy" encryption may result in application bugs (e.g., based on mixed data manipulation language (DML) operations, files larger than a maximum threshold size, etc.). Furthermore, in some cases, fields may include corrupted data records, historical information, or tracked changes that may not be recognized and handled by the UDD. The UDD may instead perform unexpected modifications to the data record or metadata, such as updating a last modified timestamp or performing operations associated with object or field specific hooks.

Utilizing the UDD to load and save data records may introduce a large amount of overhead into the system. For example, as compared to performing a standard query call (e.g., a procedural language extension to structured query language (PL/SQL) call), loading and saving using the UDD may utilize an order of magnitude more resources (e.g., memory, processing, or time resources). In some cases, parallelizing the UDD-run encryption with other database processes may result in access protection problems (e.g., failing to lock access to certain object, fields, or data records during encryption). Furthermore, in some cases, the UDD may operate using coarse-grained loads, rather than fine-grained loads. The coarse-grained load may not allow the UDD to select just the data records to be encrypted, and may lead to the UDD loading and saving many additional and unnecessary data records. Additionally, the UDD-run process may lack memory consumption control, resulting in resource allocation issues if too many attachments are encrypted within a data chunk.

To avoid these issues while providing mass encryption functionality, the database server 310 may instead implement a query based process, such as a process implementing PL/SQL, and an improved data chunking strategy. Utilizing a query language (e.g., PL/SQL, as opposed to the UDD) may reduce the complexity and performance hit on the database system. The database server 310 may partition the data records into data chunks based on data for attachments, as opposed to data for the parent files or tables of the attachments. In this way, the database server 310 may determine a more accurate estimate of the amount of resources needed to encrypt, decrypt, or re-encrypt the data records. That is, the database server 310 may identify the amount of data to include in a data chunk based on the attachment or content files, rather than files associated with the attachment or content files.

In one specific example, to perform a mass encryption, decryption, key rotation, or scheme modification process, the database server 310 may utilize the PL/SQL layer for data processing and may use Java code or the Java layer for actual encryption and decryption operations. For each data chunk, the database server 310 may lock user access to the data records with data to be encrypted or decrypted. In some cases, the database server 310 may additionally lock access to other fields or records associated with the data records with data to be encrypted or decrypted. In some cases, the database server 310 may not lock data records that are already up-to-date (i.e., do not contain data to be encrypted or decrypted), and a user may continue to access these unlocked data records throughout the mass encryption process. Additionally, any data records not associated with the data chunk currently being processed by the database server 310 may remain online, and be accessible to users. The database server 310 may retrieve the locked data records, and may encrypt or decrypt the records according to the latest parameters (e.g., an active encryption key, an active encryption scheme, etc.). The database server 310 may store the updated data records in memory (e.g., in a table). The database server 310 may continually update the versions of the data records stored in the database 315, or may update the data records upon completion of processing the data chunk based on the table in memory.

The database server 310 may handle related entities (e.g., fields, data objects, etc.) by updating encryption for each of the related entities before updating encryption options or statuses at the database 315 or for a user device 305. The database server 310 may implement an incremental process for updating encryption, where the database server 310 may only lock user access to fields or data objects marked for encryption (e.g., either all of the data marked for encryption, or just the data in a data chunk actively being encrypted or decrypted). Using PL/SQL or a similar query language approach may allow the database server 310 to refrain from updating last modified timestamps for the data records. For example, PL/SQL may avoid standard UDD or platform processing, which may allow the database server 310 to avoid automatically updating the timestamp. In this way, a system log that tracks data record modifications may not indicate when a data record is encrypted without a change to the plaintext. However, the database server 310 may support an encryption log or general process log that may indicate the processes and tasks involved in the encryption or decryption processes.

Additionally or alternatively, the query language based approach to mass encryption may provide error handling. Instead of failing during an encryption process, the database server 310 may determine any processes that may fail, and may record the errors in a log line. The database server 310 may initially skip performing an encryption process on these data records with errors, and may continue performing encryption processes on the remaining data records. In some cases, the database server 310 may provide service protection by controlling memory consumption. That is, the database server 310 may run the background mass encryption job using an amount of memory or processing resources below a certain threshold, and may not surpass the memory or processing resource thresholds. In some cases, the database server 310 may handle any issues with setup or parameters of data objects or fields, so that no manual user intervention is required for setup changes, such as disabling triggers, features, or functions.

In some cases, the query language based mass encryption procedure may include additional features to improve the reliability and scalability of encryption. In one example, the database server 310 and database 315 may include an improved mechanism for scalable searching of the database 315. For example, the database server 310 may implement a PL/SQL function for searching and identifying any data records stored in the database 315 corresponding to an encryption process. The database server 310 may search based on a tenant identifier, a field identifier, a data object identifier, an encryption status identifier, an encryption scheme identifier, or any combination of these parameters. In a second example, the database server 310 may utilize the query language to provide deprovisioning on demand when or if a tenant opts out of encryption. For example, the database server 310 may identify any encrypted records 320 stored in the database 315 for the tenant (e.g., using the improved search feature described above), and may decrypt and update the stored records in the database 315 with unencrypted (e.g., plaintext) versions of the data. The database 315 or database server 310 may send a message to the user device 315 indicating when all data for a tenant is unencrypted following an opt-out procedure.

In another aspect, the database server 310 may additionally or alternatively support a rotate and destroy policy for mass re-keyings. For example, rather than simply rotating encryption keys from archived keys to a new active encryption key, the database server 310 may additionally destroy unused archived encryption keys following the mass re-key process. Such a policy may be implemented in probabilistic or deterministic encryption schemes. For example, for deterministic encryption, a rotate and destroy policy may limit the amount of time that the database system implements multiple encryption keys (e.g., the database 315 may include encrypted records 320 corresponding to different encryption keys only during the mass re-key process). This policy may support unicity requirements and grouping by functionality for encrypted records 320.

The database server 310 may additionally include features for improved user visibility on the mass encryption process. The database server 310 may send information about the encryption process to a user device 305 to be displayed in a user interface for a user. In some cases, the information may be sent in the form of an email message, in data to be displayed in the user interface, or in some other form. The database server 310 may perform a preliminary data analysis on the data records stored in the database 315 that are marked for encryption, and may dynamically configure chunk sizes for the data record groups. For example, based on the total number of data records, the total size of data records, an amount of available memory or processing power for the background job, or some combination of these or other parameters associated with the encryption process, the database server 310 may determine a range of data chunk sizes for the background encryption job. The range of data chunk sizes may be based on a data size of the data chunk or a number of data records in the data chunk, and the database server 310 may partition the total set of data records for mass encryption, decryption, or re-encryption into data chunks either equal or varying in size within the determined range. Additionally or alternatively, the database server 310 may configure other parameters for encryption based on the type of mass encryption (e.g., encryption, decryption, re-key, or scheme change), the associated data records, the tenant, or some combination of these or similar factors. The database server 310 may transmit an indication of the configured parameters to the user device 305, and in some cases may send alerts based on the preliminary data analysis. For example, if the database server 310 identifies any issues with the encryption process (e.g., the job is estimated to require too many resources, the job may include one or more errors, etc.), the database server 310 may transmit a corresponding alert to the user device 305 to notify a user. In some cases, the user may override the alert, or may contact a system administrator to monitor or update the encryption process to handle the identified issues.

The system may include multiple options or parameters that may affect the execution of the mass encryption application 335. In some cases, the mass encryption application 335 may support a combination of mass encrypting, mass decrypting, mass re-keying, or mass scheme modification. In such cases, the mass encryption application 335 may include an indication of a list of encrypted fields to have their values encrypted or re-encrypted with the active encryption key and encryption scheme. The mass encryption application 335 may also include an indication of a list of plain fields to have their values decrypted. The mass encryption application 335 may include an indication of a data chunk size (e.g., a number of data records in a record group). The data chunk size may be based on the associated tenant or based on a user selection. The mass encryption application 335 may further include one or more indications of whether field histories, track changes, CLOBs, attachments, or content files should be encrypted along with the corresponding fields. Furthermore, the mass encryption application 335 may include an indication of how to handle data encrypted using a destroyed encryption key. For example, based on a default handler or a user selection, the mass encryption application 335 may determine whether to throw an error when processing a data record encrypted with a destroyed or revoked encryption key, or whether to overwrite the data record.

In some cases, the database server 310 may transmit an indication of statistics associated with the encryption process or data records stored in the database 315. For example the statistics may include encryption statuses for data records associated with a tenant, estimations of an encryption process determined by an estimator application 330 (e.g., an estimated time, an estimated amount of resources, etc.), or other statistics associated with an encryption process. These statistics may be sent to the user device 305 in pseudo-real-time (e.g., the database server 310 may automatically send updates to the user device 305 throughout an encryption process after updating each data record, a group of data records, a data chunk, the total set of data records, etc.) or based on a trigger from the user device 305. For example, a user may select to send an encryption estimation request to the database server 310, and the database server 310 may send an updated version of the statistics associated with a tenant or an encryption process to the user device 305 in response. The user may receive these encryption statistics in an email message (e.g., generated by the estimator application 330), or may view the encryption statistics in an encryption dashboard 340 displayed in a user interface. The encryption dashboard 340 may display an overview of the state of a tenant's data (e.g., encryption scheme, encryption key, amount of data encrypted, progress of encryption process, etc.). The user may initiate an encryption process with a selection in a user interface (e.g., the encryption dashboard 340 or some other user interface or application). In certain aspects, the database server 310 may include features to override a user selection or restrict selection options based on an estimation of the encryption process, such as a hit on the memory or processing power of the database system exceeding a pre-determined threshold.

Figure 4:
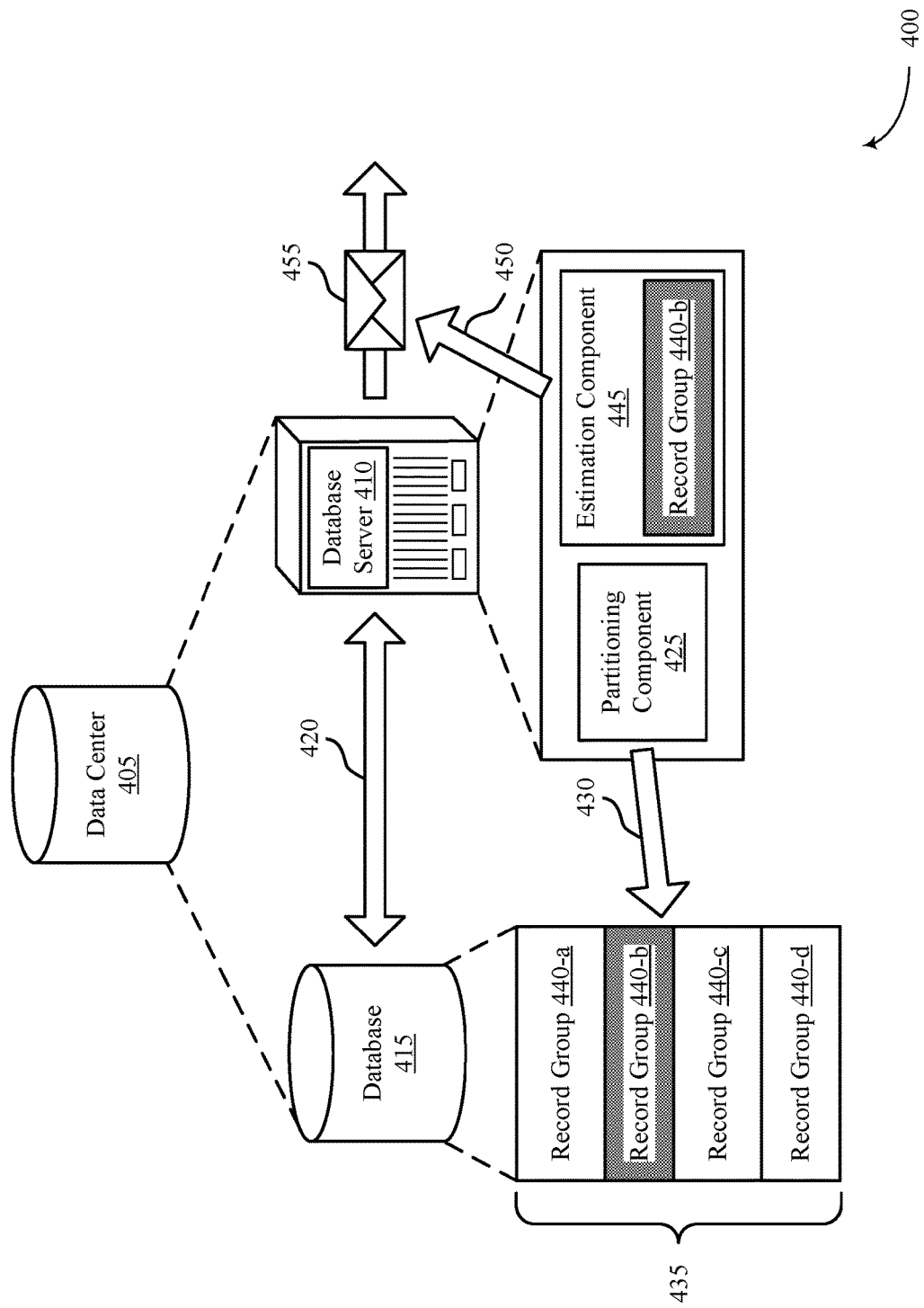
FIG. 4 illustrates an example of a mass encryption estimation process that supports mass encryption management in accordance with aspects of the present disclosure.

FIG. 4 illustrates an example of a mass encryption estimation process 400 that supports mass encryption management in accordance with various aspects of the present disclosure. The mass encryption estimation process 400 may occur within a data center 405, which may be an example of a data center 120 as described with reference to FIG. 1. The data center 405 may include one or more database servers 410 and databases 415, which may communicate using link 420. The database server 410 may perform the mass encryption estimation process 400 using a partitioning component 425 and an estimation component 445, which in some cases may be components of an estimator application 330 as described with respect to FIG. 3. The mass encryption estimation process 400 may allow the database server 410 to determine the memory and processing overhead for a mass encryption procedure, and transmit an indication of that information to a user device.

The database 415 may store a large number (e.g., thousands, hundreds of thousands, millions, etc.) of data records. When the database server 410 identifies an encryption job, such as a mass encryption job, a mass decryption job, a mass key rotation job, an encryption scheme modification job, or a similar encryption process related to many record groups stored at the database 415, the database server 410 or database 415 may identify the a total set of data records 435 corresponding to the encryption job. For example, the database server 410 or database 415 may search the database 415 storage based on a tenant identifier associated with the encryption job, a specific data object or field associated with the encryption job, or a data encryption scheme. The database server 410 or database 415 may identify the total set of data records 435 for the encryption process. Based on the data shape (e.g., the number of data records, the amount of data, a distribution of the data amongst data objects, fields, or records, etc.) of the total set of data records 435, the database server 410 may estimate the performance of the encryption job. This estimation may be performed by an estimation component 440 of the database server 410, which may also be referred to as a mass encryption estimator, and may identify information related to the entire encryption job or to an encryption job for a specific record group 435. For example, at 430, a partitioning component 425 may partition the identified total set data records 435 into one or more data record groups 440 (e.g., record groups 440-a, 440-b, 440-c, and 440-d), which may be referred to as data chunks, for processing. In some cases, the partitioning component 425 may perform the data chunking based on a default record group size (e.g., 100,000 data records) or based on a dynamically selected record group size. Each record group 440 may have a same number of data records, or may have a number of data records or a data size within a data size range.

In some cases, the estimation component 445 may determine an estimation for each record group 440 of the set of record groups. The database server 410 may send a separate email message to a user device for each record group 440. The email message may include information indicating an amount of work that the database server 410 may perform on that record group 440 in order to encrypt, decrypt, or re-encrypt the data records of the record group 440. For example, the estimation component 445 may analyze record group 440-b, and may generate an email message at 450. At 455, the database server 410 may send the email message to a user device to be displayed in a user interface. In one specific example, an email message generated by the estimation component 445 for a record group 440 may include the following text:

"We are ready to encrypt or decrypt the historical data for the entity CustomEntityDataTemplate(a0Q), as you requested. Here's what the mass encryption task is going to do.
Encrypt these fields: [00Nj0000009opsd, 00Nj0000009opsh]
Decrypt these fields: [ ]
We will encrypt or decrypt the requested fields according to these rules:
The data will be included
The CLOBs will be included
The history will not be included
The attachments will not be included
The content will not be included
Decrypting key-destroyed data will make sync fail with no effect to any data
This is the scale of the job, according to our estimate:
1 chunk of 103,477 records
103,477 records have at least one column to be encrypted or decrypted (computed in 02 s and 615 ms).
0 records are encrypted with a destroyed key. (computed in 0 ms).
The field 00Nj0000009opsd has 22,004 CLOBs to encrypt for a total of 6,349,610 characters (computed in 03 m, 49 s, and 718 ms).
The estimation was computed in 03 m, 52 s, and 335 ms"
This may be an example of one possible format for an email message. Other possible email formats may include different parameters about the encryption process or the record group 440. The above process may be an example of an expensive estimation process (e.g., based on the large number of CLOBs present). In some cases, the database server 410 may perform the estimation process on the order of a few seconds or even milliseconds.

The estimation component 445 may include similar code to a mass encryption component, such as the mass encryption application 335 described with respect to FIG. 3, or may include an engine for simulating the code for the mass encryption component. For example, the estimation component 445 may utilize PL/SQL queries, or may utilize other forms of queries or data retrieval methods. However, the estimation component 445 may emulate a read-only run for the mass encryption code, as it may not perform any modification of the data records (e.g., either plaintext or ciphtertext). Based on emulating the code for the estimation component 445, the estimation component 445 may determine an estimated processing time of a record group 440 for encrypting, decrypting, re-keying, changing scheme, or some combination of these processes.

The estimation component 445 and a mass encryption component may share similar or identical logic for determining which fields, data objects, or tenants are affected by an encryption process, and/or for determining the encryption options to use for the encryption process. The estimation component 445 and mass encryption component may share a code path for generating message queue (MQ) message payloads. However, the two applications may differ in data chunk sizes for processing. The mass encryption component may send one or more queries (e.g., PL/SQL queries) to the database 415 to retrieve data records or record groups 440 for encryption. Rather than sending separate queries, the partitioning component 425 or estimation component 445 may leverage the same queries, and may perform a count based on the queried data records.

In some cases, the database server 410 may send the estimated parameters of the encryption process or data records to a user device and store the estimated parameters in a log at the database server 410 or database 415. In some examples, the estimation component 445 may disable sending the estimated parameters to the user device (e.g., in email messages at 455). For example the estimation component 445 may include an indication of a threshold number of record groups 440 above which the estimation component 445 may refrain from generating or transmitting the email messages (e.g., in order to refrain from transmitting a large amount of emails to the user device). Additionally or alternatively, a user or a system administrator may disable the email message generation or transmission for all encryption processes, or on a case-by-case basis. In some cases, the database server 410 may implement splunk queries for computing encryption statistics for the database 415.

In some cases, the database server 410 may implement one or more rules based on the mass encryption estimation. For example, the database server 410 may check to determine whether an estimation was performed for an encryption process before proceeding with the encryption job. In some cases, the database server 410 may further support a threshold time for performing the estimation. For example, the database server 410 may automatically perform an estimation following a certain threshold amount of time, or the database server 410 may not perform an encryption job unless the estimation component 445 performed an estimation corresponding to the encryption job within a certain threshold amount of time (e.g., a week). This may keep estimations up to date, and may help avoid unexpected occurrences (e.g., overly large impacts on memory) when performing an encryption process.

The estimation component 445 may include recommendations or alerts in a message to a user device. For example, the estimation component 445 may calculate a cumulative size of BLOBs or CLOBs in a record group 440 or the total set of data records 435, and may generate an alert to send to a user device (e.g., in an email message) if an identified amount of data for processing is greater than a certain threshold. The threshold may be based on one or more parameters for the encryption process. Additionally, the estimation component 445 may send a recommendation or an alert based on default or selected encryption parameters. In some cases, the estimation component 445 may send a message to a system administrator based on the mass encryption estimation process.

Instead of generating an email for each record group 440, the estimation component 445 may generate a single email for the total set of data records 435. The estimation component 445 may persist information or statistics corresponding to each record group 440 of the total set of data records 435 at the database server 410 or the database 415. For example, the estimation component 445 may process each record group 440 of the set of record groups asynchronously, in parallel, or all together, and may aggregate statistics and information about each record group 440 and the total set of data records 435. The aggregated statistics may be sorted into data buckets based on the encryption key used for each data record. The estimation component 445 may then generate a single summary report email corresponding to the entire encryption process, and the database server 410 may transmit the summary report email to a user device. The summary report may include additional insights, such as indications of data too large for encryption or data no longer decryptable based on a revoked or destroyed encryption key.

In some cases, the estimation component 445 may determine an execution level for the mass encryption process, as well as an estimate for the amount of time performing the mass encryption process will take. The estimation component 445 may determine the execution level based on a size of the data to be encrypted or decrypted, an estimated amount of time for encryption or decryption, or tenant settings for encryption or decryption. Some examples of execution levels may include a "clear to run now" level, a "clear to run on the weekend" level, and a "contact system administrator for clearance" level, although many other execution levels are possible. The estimation component 445 may calculate a time estimate for completing an encryption process (e.g., either on a record group 440 or on the total set of data records 435) based on a size of the data, a number of data records, historical information related to past encryption processes, one or more generated or pre-programmed heuristics (e.g., leveraging log lines), processing capabilities of the database server 410, or some combination of these. In addition to the time estimate, the estimation component 445 may determine a level of central processing unit (CPU) or memory consumption, which may be based in part on the time estimate.

The estimation component 445 may include a cleanup or verifier component, that may check that all data records in the total set of data records 435 are encrypted correctly. For example, the estimation component 445 may search the database 415 following a mass decryption for any plaintext in fields that should contain ciphertext. Alternatively, the estimation component 445 may search the database 415 following a mass encryption, key rotation, or scheme change to verify the encryption scheme and encryption key are correct.

FIG. 5 illustrates an example of an encryption dashboard 500 that supports mass encryption management in accordance with various aspects of the present disclosure. The encryption dashboard 500 may be displayed in a user interface of a user device, and a user may interact with the encryption dashboard 500 using triggers, such as mouse clicks, keyboard input, etc. The encryption dashboard 500 may be tenant-specific, and may display encryption statistics for data object types 505 for the specific tenant. In some cases, to access or view the tenant-specific encryption dashboard 500, a user may input a tenant or user specific password into the user device. The encryption statistics displayed in the encryption dashboard 500 may be determined based on data records stored in a database, such as a database 270, 315, or 415, as described with reference to FIGS. 2 through 4. In some cases, a mass encryption estimator may determine one or more of the encryption statistics displayed in the encryption dashboard. The encryption dashboard 500 illustrated in FIG. 5 shows one possible implementation of a user interface for presenting information about data in a database, but many other implementations may be used as well.

The encryption dashboard 500 may display an overview of information for different data object types 505. For example, the encryption dashboard 500 may include a data encrypted value 510, an active encryption key value 515, or other relevant encryption information for a data object type 505. A data encrypted value 510 may indicate an amount of data records that are encrypted at rest for the data type object 505. An active encryption key value 515 may indicate, of the encrypted data records, how many are encrypted using an active encryption key. The data encrypted values 510 and active encryption key values 515 may be examples of percentages, ratios, sizes, or counts. In some cases, the encryption dashboard 500 may display indications of every data object type 505 for a tenant. In other cases, the encryption dashboard 500 may display indications of only data object types 505 that contain some encrypted data records stored in the database. For example, as illustrated, the encryption dashboard 500 may display data object types 505-*a*, 505-*b*, and 505-*c*, with corresponding data encrypted values 510-*a*, 510-*b*, and 510-*c* and active encryption key values 515-*a*, 515-*b*, and 515-*c*, respectively. A user may select a data object type 505 to view additional information corresponding to that data object type 505. For example, the user may select data object type 505-*b*, and the user device may display more detailed information for data object type 505-*b*.

For a selected data object type 505, such as data object type 505-*b*, the encryption dashboard 500 may display one or more fields 520 (e.g., fields 520-*a*, 520-*b*, 520-*c*, and 520-*d*) corresponding to that data object type 505. The encryption dashboard 500 may additionally display parameters associated to each field 520. In some cases, a user or tenant may select the parameters to display for a field 520. As illustrated, the encryption dashboard may display an application programming interface (API) name 525 (e.g., names 525-*a*, 525-*b*, 525-*c*, and 525-*d*), an encrypted records value 530 (e.g., encrypted records values 530-*a*, 530-*b*, 530-*c*, and 530-*d*), an unencrypted records value 535 (e.g., unencrypted records values 535-*a*, 535-*b*, 535-*c*, and 535-*d*), a mixed secret boolean 540 (e.g., mixed secret booleans 540-*a*, 540-*b*, 540-*c*, and 540-*d*), a mixed scheme boolean 545 (e.g., mixed scheme booleans 545-*a*, 545-*b*, 545-c, and 545-d), or any other relevant or selected parameters associated with a field 520. The API name 525 may be an example of a string used in programmable code to reference the corresponding field 520. The encrypted record values 530 and unencrypted record values 535 may be examples of percentages, ratios, sizes, or counts indicating how information is stored in the database for the corresponding field 520. The mixed secret boolean 540 may indicate whether any data records for the corresponding field 520 are encrypted using an archived or previously rotated encryption key (e.g., with a "yes" or "no" value). The mixed scheme boolean 545 may indicate whether different data records for the corresponding field 520 are encrypted using different encryption schemes, such as probabilistic encryption and deterministic encryption (e.g., with a "yes" or "no" value).

In some cases, the encryption dashboard 500 may display a subset of the total number of fields 520 for a selected data object type 505. In these cases, the encryption dashboard 500 may utilize different pages to display different subsets of the fields 520, and a user may navigate between the different subsets using page change buttons. The encryption dashboard 500 may additionally or alternatively include a status field 550, which may indicate how the displayed statistics are determined. For example, the status field 550 may indicate when all of the information was gathered for display in the encryption dashboard 500, whether the information gathering was successful, or any other relevant information regarding obtaining the values to display. In some cases, the encryption dashboard 500 may include a gather statistics button 555. A user may select the gather statistics button 555 to request the system to update the displayed information based on the current data records stored in the database. In some cases, the system may additionally or alternatively update the statistics on a periodic or scheduled basis.

Figure 6:
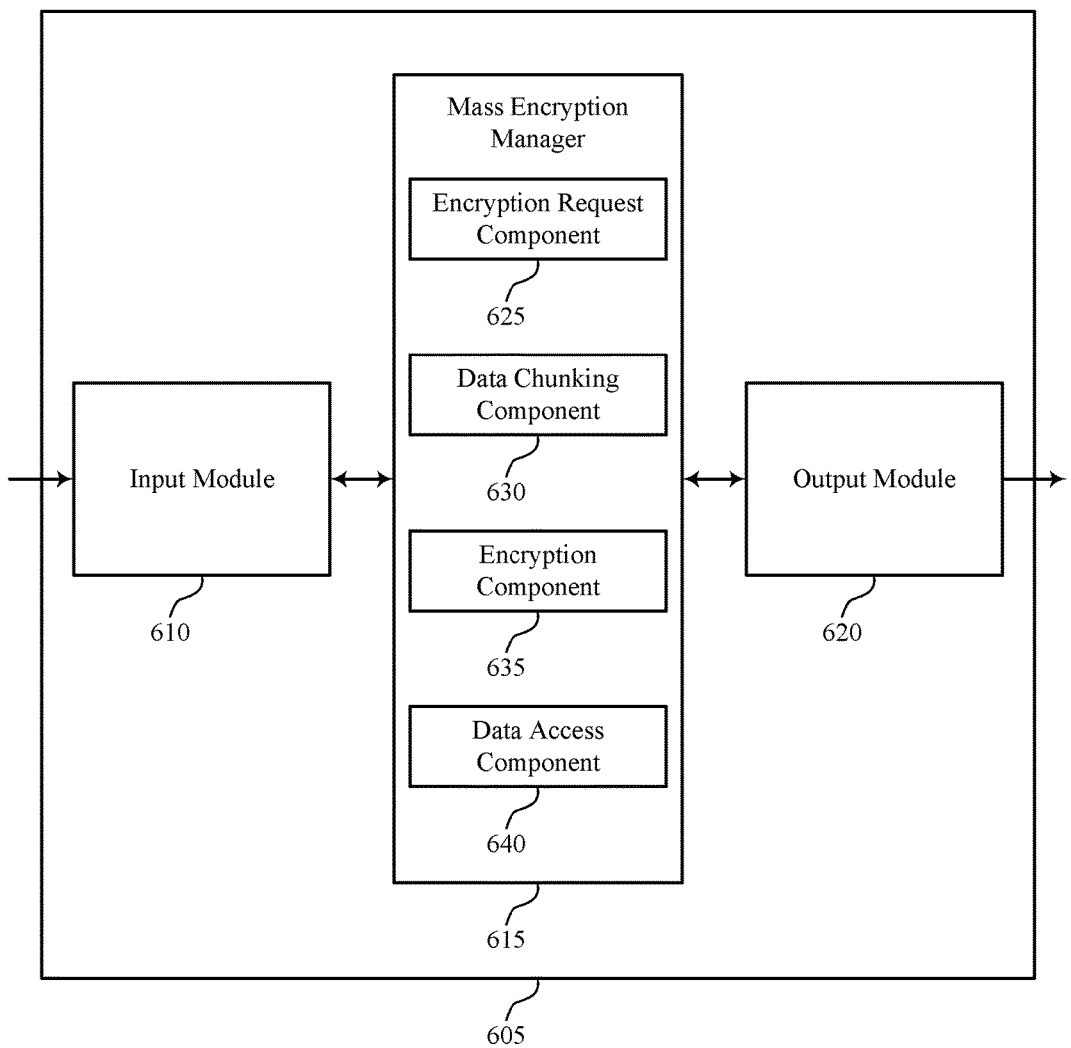
FIGS. 6 and 7 show block diagrams of a device that supports mass encryption management in accordance with aspects of the present disclosure.

FIG. 6 shows a block diagram 600 of an apparatus 605 that supports mass encryption management in accordance with aspects of the present disclosure. Apparatus 605 may include input module 610, mass encryption manager 615, and output module 620. Apparatus 605 may also include a processor and memory. Each of these components may be in communication with one another (e.g., via one or more buses). In some cases, apparatus 605 may be an example of a user terminal, a database server, or a system containing multiple computing devices.

Mass encryption manager 615 may be an example of aspects of the mass encryption manager 815 described with reference to FIG. 8. Mass encryption manager 615 may also include encryption request component 625, data chunking component 630, encryption component 635, and data access component 640.

Mass encryption manager 615 and/or at least some of its various sub-components may be implemented in hardware, software executed by a processor, firmware, or any combination thereof. If implemented in software executed by a processor, the functions of the mass encryption manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The mass encryption manager 615 and/or at least some of its various sub-components may be physically located at various positions, including being distributed such that portions of functions are implemented at different physical locations by one or more physical devices. In some examples, mass encryption manager 615 and/or at least some of its various sub-components may be a separate and distinct component in accordance with various aspects of the present disclosure. In other examples, mass encryption manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Encryption request component 625 may receive, at a database server, an encryption request to perform an encryption process on a set of records stored at the database server. Data chunking component 630 may partition the set of records into a set of record groups based on a default group size. In some cases, the default group size is based on a tenant identifier, a user input, or a combination thereof.

Encryption component 635 may perform the encryption process on a first record group of the set of record groups based on the encryption request. In some cases, encryption component 635 may perform the encryption process on a second record group of the set of record groups based on the encryption request, where the second record group is different from the first record group. In some cases, the encryption process on the first record group includes a mass encryption process, a mass decryption process, a mass key rotation process, an encryption scheme modification, or a combination thereof.

Figure 7:
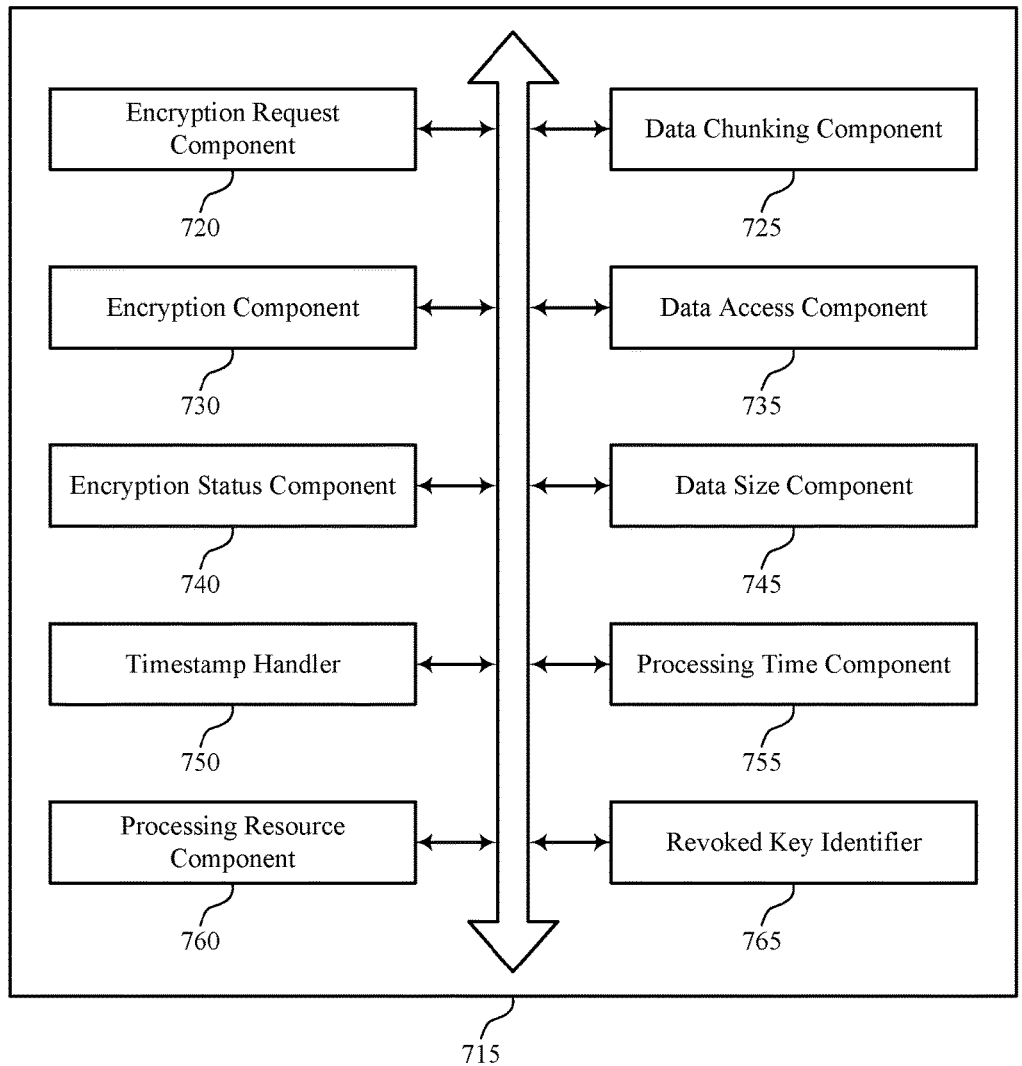

Data access component 640 may restrict access to the first record group during the encryption process of the first record group, and may restore access to the first record group upon completion of the encryption process of the first record group. In some cases, data access component 640 may additionally receive, from a user, a request to access a record of the set of records, identify that the record is included in the first record group, and transmit, to a user interface, an indication that access is restricted to the record based on restricting access to the first record group and the identification FIG. 7 shows a block diagram 700 of a mass encryption manager 715 that supports mass encryption management in accordance with aspects of the present disclosure. The mass encryption manager 715 may be an example of aspects of a mass encryption manager 615 or 815, as described with reference to FIGS. 6 and 8. The mass encryption manager 715 may include encryption request component 720, data chunking component 725, encryption component 730, data access component 735, encryption status component 740, data size component 745, timestamp handler 750, processing time component 755, processing resource component 760, and revoked key identifier 765. Each of these modules may communicate, directly or indirectly, with one another (e.g., via one or more buses).

Encryption request component 720 may receive, at a database server, an encryption request to perform an encryption process on a set of records stored at the database server. Data chunking component 725 may partition the set of records into a set of record groups based on a default group size. In some cases, the default group size is based on a tenant identifier, a user input, or a combination thereof.

Encryption component 730 may perform the encryption process on a first record group of the set of record groups based on the encryption request. In some cases, encryption component 730 may perform the encryption process on a second record group of the set of record groups based on the encryption request, where the second record group is different from the first record group. In some cases, the encryption process on the first record group includes a mass encryption process, a mass decryption process, a mass key rotation process, an encryption scheme modification, or a combination thereof.

Data access component 735 may restrict access to the first record group during the encryption process of the first record group, and may restore access to the first record group upon completion of the encryption process of the first record group. Data access component 735 may additionally receive, from a user, a request to access a record of the set of records, identify that the record is included in the first record group, and transmit, to a user interface, an indication that access is restricted to the record based on restricting access to the first record group and the identification.

Encryption status component 740 may transmit an encryption status associated with the first record group to a user interface. In some cases, encryption status component 740 may determine an encryption status associated with each record of the set of records, and may transmit an indication of the determined encryption statuses to a user interface. In some cases, the indication of the determined encryption statuses includes a ratio of encrypted records to non-encrypted records, a ratio of records encrypted with a first encryption key to records encrypted with a second encryption key, a ratio of records encrypted using a first encryption scheme to records encrypted using a second encryption scheme, a total number of encrypted records, a total number of records encrypted using a revoked encryption key, or a combination thereof.

Data size component 745 may calculate a size of each of the set of record groups and a total size of the set of record groups, and may determine to perform the encryption process on the set of record groups if the total size of the set of record groups is less than a threshold size. In some cases, data size component 745 may dynamically determine a size range for the set of record groups based on the default group size, where the size of each of the set of record groups is within the size range. In some cases, the size of a record group includes a number of records associated with the record group. In some cases, the total size of the set of record groups includes a number of record groups for performing the encryption process based on the encryption request, a total number of records associated with the set of record groups, or both. Timestamp handler 750 may refrain from updating one or more data modification timestamps associated with the first record group.

Processing time component 755 may determine an estimated processing time associated with the encryption process, transmit an indication of the estimated processing time to a user interface, and determine whether the estimated processing time is above a processing time threshold, where the indication of the estimated processing time includes an indication of whether the estimated processing time is above the processing time threshold. Processing resource component 760 may determine an estimated amount of resources associated with the encryption process and transmit an indication of the estimated amount of resources to a user interface.

Revoked key identifier 765 may identify an encrypted record of the set of records encrypted using a revoked encryption key and transmit an indication of the encrypted record to a user interface.

Figure 8:
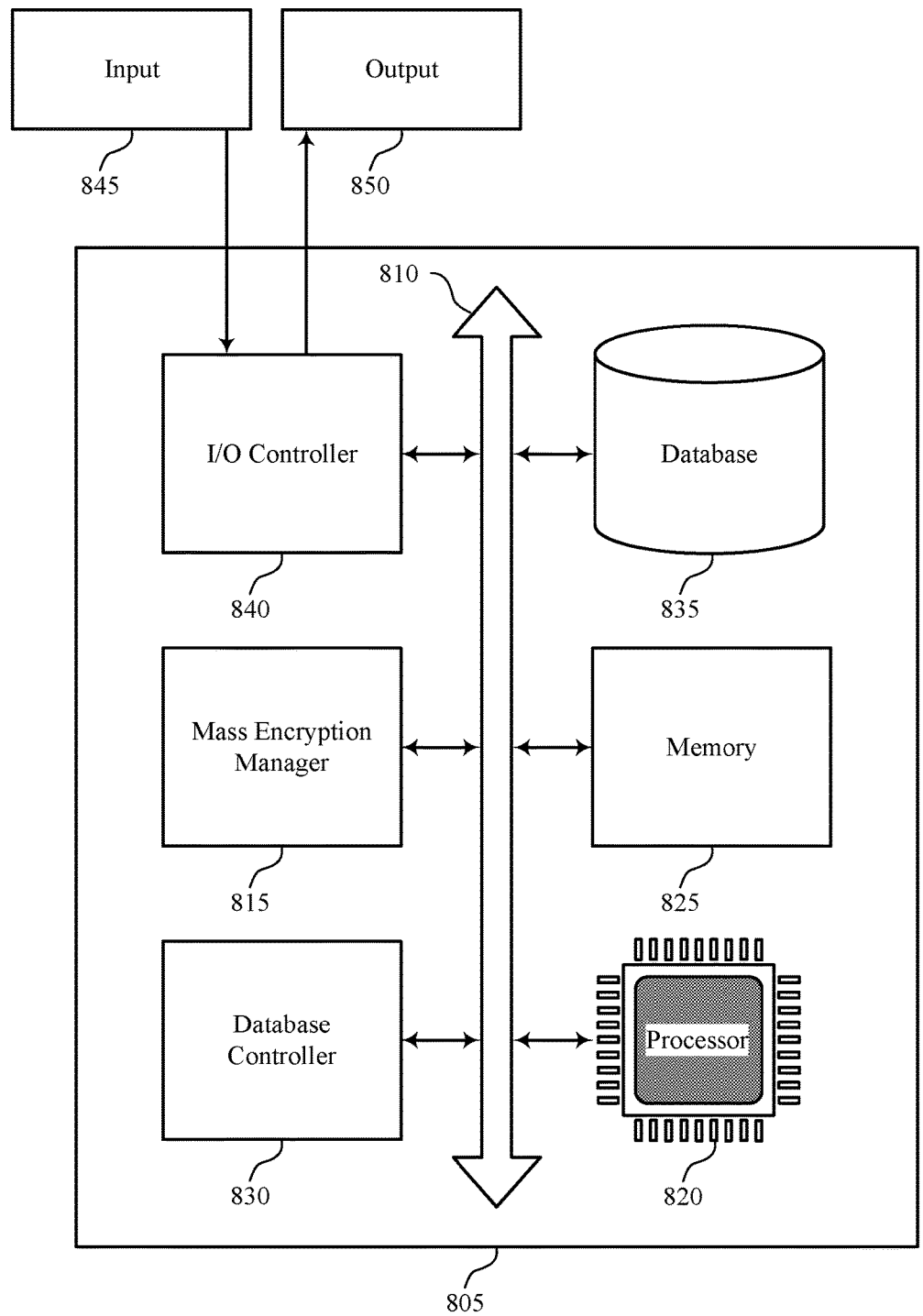
FIG. 8 illustrates a block diagram of a system including a database server that supports mass encryption management in accordance with aspects of the present disclosure.

FIG. 8 shows a diagram of a system 800 including a device 805 that supports mass encryption management in accordance with aspects of the present disclosure. Device 805 may be an example of or include the components of a database server, such as a database server 310 or 410 as described above, e.g., with reference to FIGS. 3 and 4. The database server may be a component of a data center 120 as described with reference to FIG. 1. Device 805 may include components for bi-directional data communications including components for transmitting and receiving communications, including mass encryption manager 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting mass encryption management).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices. In some cases, processor 820 and memory 825 may be configured to perform operations such as the ones described above, for example, with respect to a mass encryption manager 815.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
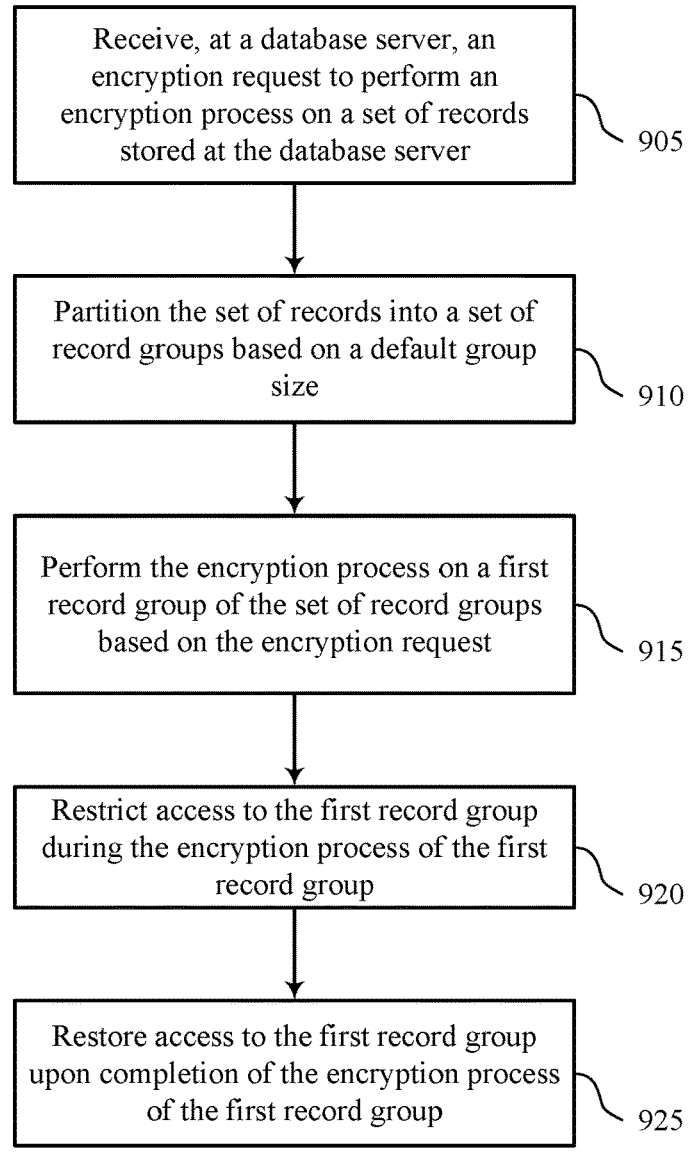
FIGS. 9 through 13 illustrate methods for mass encryption management in accordance with aspects of the present disclosure.

FIG. 9 shows a flowchart illustrating a method 900 for mass encryption management in accordance with aspects of the present disclosure. The operations of method 900 may be implemented by a database server 310 or 410 as described above, e.g., with reference to FIGS. 3 and 4, or its components as described herein. For example, the operations of method 900 may be performed by a mass encryption manager as described with reference to FIGS. 6 through 8. In some examples, a database server 310 or 410 may execute a set of codes to control the functional elements of the device to perform the functions described below. Additionally or alternatively, the database server may perform aspects of the functions described below using special-purpose hardware.

At block 905 the database server may receive, at a database server, an encryption request to perform an encryption process on a set of records stored at the database server. The operations of block 905 may be performed according to the methods described herein. In certain examples, aspects of the operations of block 905 may be performed by an encryption request component as described with reference to FIGS. 6 through 8.

At block 910 the database server may partition the set of records into a plurality of record groups based at least in part on a default group size. The operations of block 910 may be performed according to the methods described herein. In certain examples, aspects of the operations of block 910 may be performed by a data chunking component as described with reference to FIGS. 6 through 8.

At block 915 the database server may perform the encryption process on a first record group of the plurality of record groups based at least in part on the encryption request. The operations of block 915 may be performed according to the methods described herein. In certain examples, aspects of the operations of block 915 may be performed by an encryption component as described with reference to FIGS. 6 through 8.

At block 920 the database server may restrict access to the first record group during the encryption process of the first record group. The operations of block 920 may be performed according to the methods described herein. In certain examples, aspects of the operations of block 920 may be performed by a data access component as described with reference to FIGS. 6 through 8.

At block 925 the database server may restore access to the first record group upon completion of the encryption process of the first record group. The operations of block 925 may be performed according to the methods described herein. In certain examples, aspects of the operations of block 925 may be performed by a data access component as described with reference to FIGS. 6 through 8.

Figure 10:
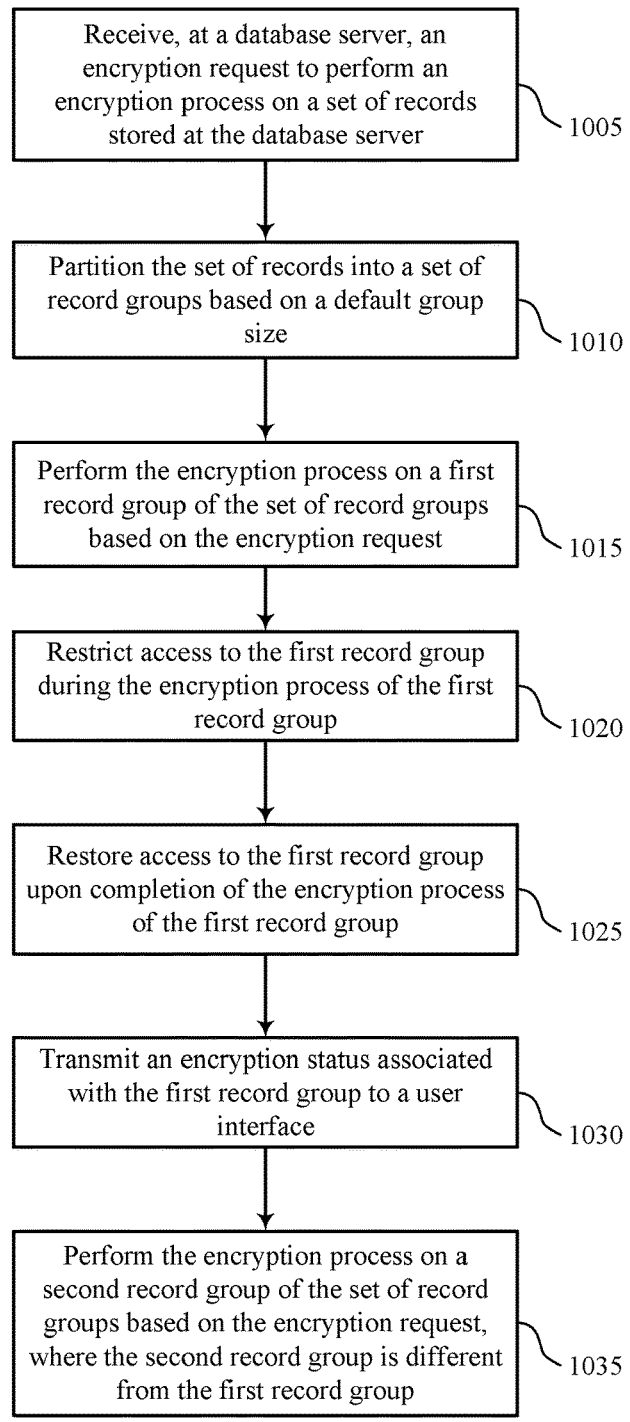

FIG. 10 shows a flowchart illustrating a method 1000 for mass encryption management in accordance with aspects of the present disclosure. The operations of method 1000 may be implemented by a database server 310 or 410 as described above, e.g., with reference to FIGS. 3 and 4, or its components as described herein. For example, the operations of method 1000 may be performed by a mass encryption manager as described with reference to FIGS. 6 through 8. In some examples, a database server 310 or 410 may execute a set of codes to control the functional elements of the device to perform the functions described below. Additionally or alternatively, the database server may perform aspects of the functions described below using special-purpose hardware.

At block 1005 the database server may receive, at a database server, an encryption request to perform an encryption process on a set of records stored at the database server. The operations of block 1005 may be performed according to the methods described herein. In certain examples, aspects of the operations of block 1005 may be performed by an encryption request component as described with reference to FIGS. 6 through 8.

At block 1010 the database server may partition the set of records into a plurality of record groups based at least in part on a default group size. The operations of block 1010 may be performed according to the methods described herein. In certain examples, aspects of the operations of block 1010 may be performed by a data chunking component as described with reference to FIGS. 6 through 8.

At block 1015 the database server may perform the encryption process on a first record group of the plurality of record groups based at least in part on the encryption request. The operations of block 1015 may be performed according to the methods described herein. In certain examples, aspects of the operations of block 1015 may be performed by an encryption component as described with reference to FIGS. 6 through 8.

At block 1020 the database server may restrict access to the first record group during the encryption process of the first record group. The operations of block 1020 may be performed according to the methods described herein. In certain examples, aspects of the operations of block 1020 may be performed by a data access component as described with reference to FIGS. 6 through 8.

At block 1025 the database server may restore access to the first record group upon completion of the encryption process of the first record group. The operations of block 1025 may be performed according to the methods described herein. In certain examples, aspects of the operations of block 1025 may be performed by a data access component as described with reference to FIGS. 6 through 8.

At block 1030 the database server may transmit an encryption status associated with the first record group to a user interface. The operations of block 1030 may be performed according to the methods described herein. In certain examples, aspects of the operations of block 1030 may be performed by an encryption status component as described with reference to FIGS. 6 through 8.

At block 1035 the database server may perform the encryption process on a second record group of the plurality of record groups based at least in part on the encryption request, wherein the second record group is different from the first record group. The operations of block 1035 may be performed according to the methods described herein. In certain examples, aspects of the operations of block 1035 may be performed by an encryption component as described with reference to FIGS. 6 through 8.

Figure 11:
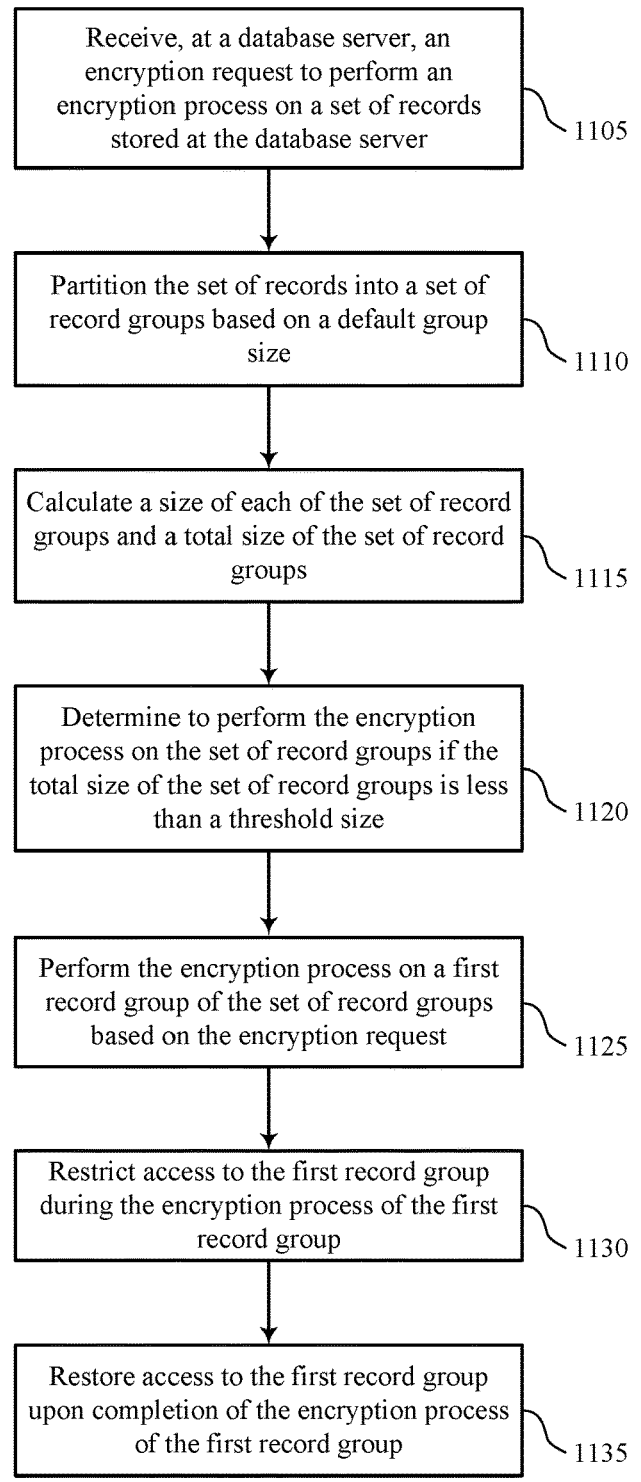

FIG. 11 shows a flowchart illustrating a method 1100 for mass encryption management in accordance with aspects of the present disclosure. The operations of method 1100 may be implemented by a database server 310 or 410 as described above, e.g., with reference to FIGS. 3 and 4, or its components as described herein. For example, the operations of method 1100 may be performed by a mass encryption manager as described with reference to FIGS. 6 through 8. In some examples, a database server 310 or 410 may execute a set of codes to control the functional elements of the device to perform the functions described below. Additionally or alternatively, the database server may perform aspects of the functions described below using special-purpose hardware.

At block 1105 the database server may receive, at a database server, an encryption request to perform an encryption process on a set of records stored at the database server. The operations of block 1105 may be performed according to the methods described herein. In certain examples, aspects of the operations of block 1105 may be performed by an encryption request component as described with reference to FIGS. 6 through 8.

At block 1110 the database server may partition the set of records into a plurality of record groups based at least in part on a default group size. The operations of block 1110 may be performed according to the methods described herein. In certain examples, aspects of the operations of block 1110 may be performed by a data chunking component as described with reference to FIGS. 6 through 8.

At block 1115 the database server may calculate a size of each of the plurality of record groups and a total size of the plurality of record groups. The operations of block 1115 may be performed according to the methods described herein. In certain examples, aspects of the operations of block 1115 may be performed by a data size component as described with reference to FIGS. 6 through 8.

At block 1120 the database server may determine to perform the encryption process on the plurality of record groups if the total size of the plurality of record groups is less than a threshold size. The operations of block 1120 may be performed according to the methods described herein. In certain examples, aspects of the operations of block 1120 may be performed by a data size component as described with reference to FIGS. 6 through 8.

At block 1125 the database server may perform the encryption process on a first record group of the plurality of record groups based at least in part on the encryption request. The operations of block 1125 may be performed according to the methods described herein. In certain examples, aspects of the operations of block 1125 may be performed by an encryption component as described with reference to FIGS. 6 through 8.

At block 1130 the database server may restrict access to the first record group during the encryption process of the first record group. The operations of block 1130 may be performed according to the methods described herein. In certain examples, aspects of the operations of block 1130 may be performed by a data access component as described with reference to FIGS. 6 through 8.

At block 1135 the database server may restore access to the first record group upon completion of the encryption process of the first record group. The operations of block 1135 may be performed according to the methods described herein. In certain examples, aspects of the operations of block 1135 may be performed by a data access component as described with reference to FIGS. 6 through 8.

Figure 12:
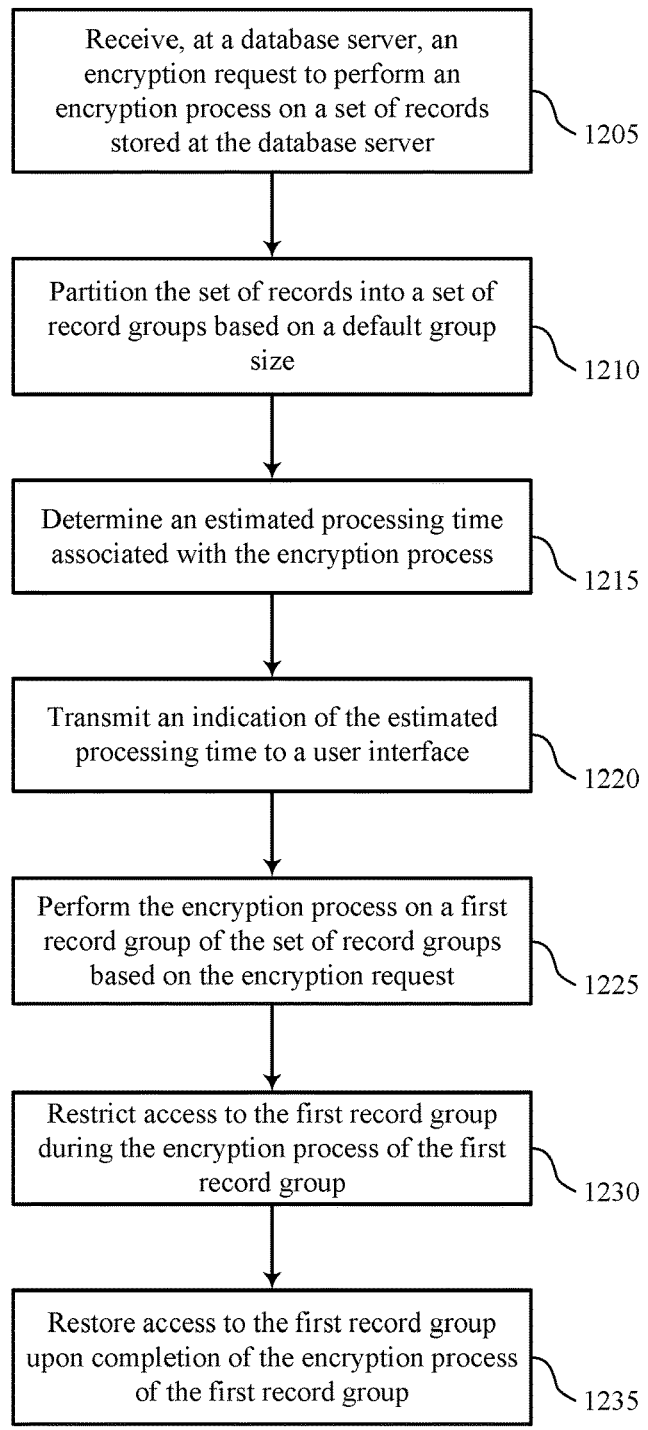

FIG. 12 shows a flowchart illustrating a method 1200 for mass encryption management in accordance with aspects of the present disclosure. The operations of method 1200 may be implemented by a database server 310 or 410 as described above, e.g., with reference to FIGS. 3 and 4, or its components as described herein. For example, the operations of method 1200 may be performed by a mass encryption manager as described with reference to FIGS. 6 through 8. In some examples, a database server 310 or 410 may execute a set of codes to control the functional elements of the device to perform the functions described below. Additionally or alternatively, the database server may perform aspects of the functions described below using special-purpose hardware.

At block 1205 the database server may receive, at a database server, an encryption request to perform an encryption process on a set of records stored at the database server. The operations of block 1205 may be performed according to the methods described herein. In certain examples, aspects of the operations of block 1205 may be performed by an encryption request component as described with reference to FIGS. 6 through 8.

At block 1210 the database server may partition the set of records into a plurality of record groups based at least in part on a default group size. The operations of block 1210 may be performed according to the methods described herein. In certain examples, aspects of the operations of block 1210 may be performed by a data chunking component as described with reference to FIGS. 6 through 8.

At block 1215 the database server may determine an estimated processing time associated with the encryption process. The operations of block 1215 may be performed according to the methods described herein. In certain examples, aspects of the operations of block 1215 may be performed by a processing time component as described with reference to FIGS. 6 through 8.

At block 1220 the database server may transmit an indication of the estimated processing time to a user interface. The operations of block 1220 may be performed according to the methods described herein. In certain examples, aspects of the operations of block 1220 may be performed by a processing time component as described with reference to FIGS. 6 through 8.

At block 1225 the database server may perform the encryption process on a first record group of the plurality of record groups based at least in part on the encryption request. The operations of block 1225 may be performed according to the methods described herein. In certain examples, aspects of the operations of block 1225 may be performed by an encryption component as described with reference to FIGS. 6 through 8.

At block 1230 the database server may restrict access to the first record group during the encryption process of the first record group. The operations of block 1230 may be performed according to the methods described herein. In certain examples, aspects of the operations of block 1230 may be performed by a data access component as described with reference to FIGS. 6 through 8.

At block 1235 the database server may restore access to the first record group upon completion of the encryption process of the first record group. The operations of block 1235 may be performed according to the methods described herein. In certain examples, aspects of the operations of block 1235 may be performed by a data access component as described with reference to FIGS. 6 through 8.

Figure 13:
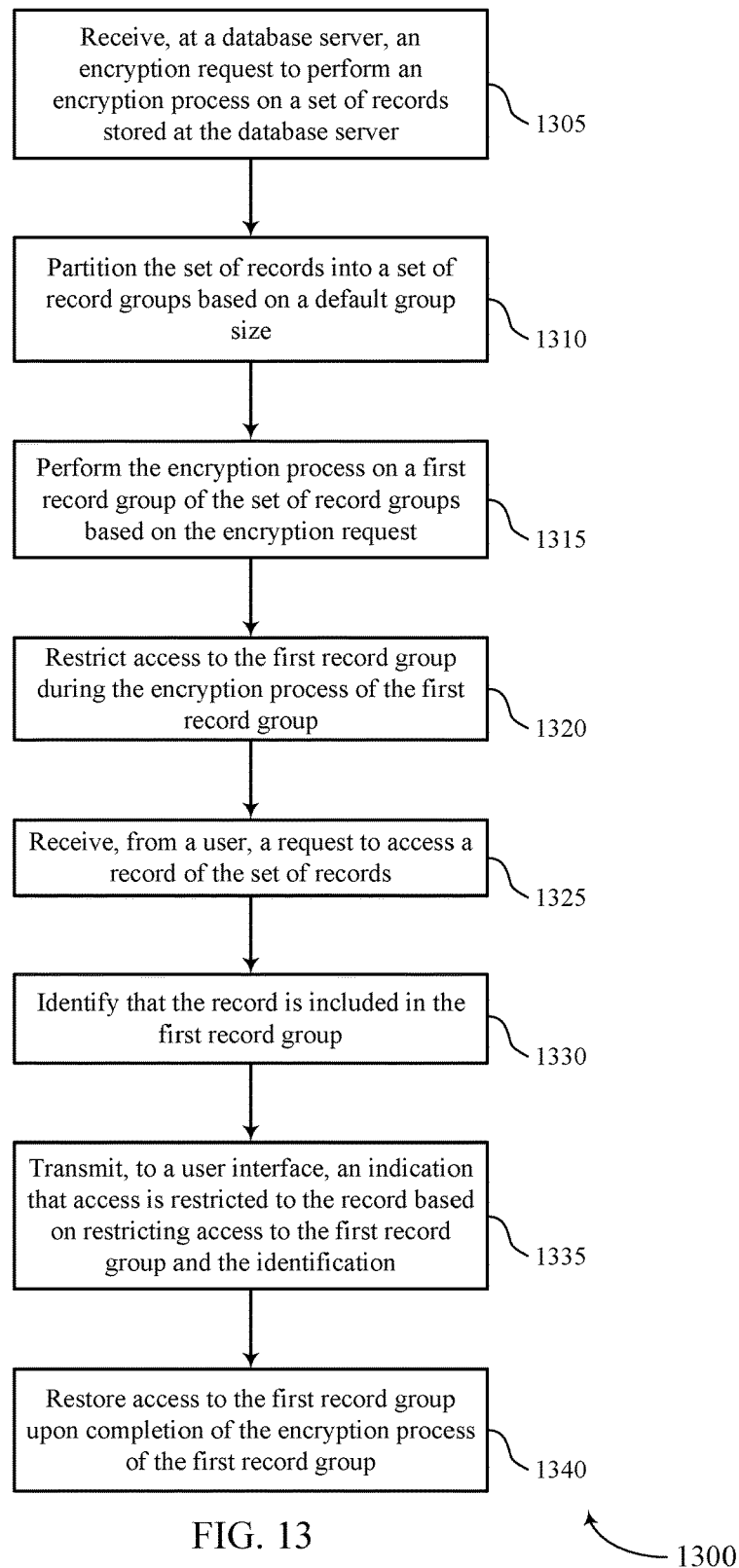

FIG. 13 shows a flowchart illustrating a method 1300 for mass encryption management in accordance with aspects of the present disclosure. The operations of method 1300 may be implemented by a database server 310 or 410 as described above, e.g., with reference to FIGS. 3 and 4, or its components as described herein. For example, the operations of method 1300 may be performed by a mass encryption manager as described with reference to FIGS. 6 through 8. In some examples, a database server 310 or 410 may execute a set of codes to control the functional elements of the device to perform the functions described below. Additionally or alternatively, the database server may perform aspects of the functions described below using special-purpose hardware.

At block 1305 the database server may receive, at a database server, an encryption request to perform an encryption process on a set of records stored at the database server. The operations of block 1305 may be performed according to the methods described herein. In certain examples, aspects of the operations of block 1305 may be performed by an encryption request component as described with reference to FIGS. 6 through 8.

At block 1310 the database server may partition the set of records into a plurality of record groups based at least in part on a default group size. The operations of block 1310 may be performed according to the methods described herein. In certain examples, aspects of the operations of block 1310 may be performed by a data chunking component as described with reference to FIGS. 6 through 8.

At block 1315 the database server may perform the encryption process on a first record group of the plurality of record groups based at least in part on the encryption request. The operations of block 1315 may be performed according to the methods described herein. In certain examples, aspects of the operations of block 1315 may be performed by an encryption component as described with reference to FIGS. 6 through 8.

At block 1320 the database server may restrict access to the first record group during the encryption process of the first record group. The operations of block 1320 may be performed according to the methods described herein. In certain examples, aspects of the operations of block 1320 may be performed by a data access component as described with reference to FIGS. 6 through 8.

At block 1325 the database server may receive, from a user, a request to access a record of the set of records. The operations of block 1325 may be performed according to the methods described herein. In certain examples, aspects of the operations of block 1325 may be performed by a data access component as described with reference to FIGS. 6 through 8.

At block 1330 the database server may identify that the record is included in the first record group. The operations of block 1330 may be performed according to the methods described herein. In certain examples, aspects of the operations of block 1330 may be performed by a data access component as described with reference to FIGS. 6 through 8.

At block 1335 the database server may transmit, to a user interface, an indication that access is restricted to the record based at least in part on restricting access to the first record group and the identification. The operations of block 1335 may be performed according to the methods described herein. In certain examples, aspects of the operations of block 1335 may be performed by a data access component as described with reference to FIGS. 6 through 8.

At block 1340 the database server may restore access to the first record group upon completion of the encryption process of the first record group. The operations of block 1340 may be performed according to the methods described herein. In certain examples, aspects of the operations of block 1340 may be performed by a data access component as described with reference to FIGS. 6 through 8.

A method of encryption management is described. The method may include receiving, at a database server, an encryption request to perform an encryption process on a set of records stored at the database server, partitioning the set of records into a plurality of record groups based at least in part on a default group size, and performing the encryption process on a first record group of the plurality of record groups based at least in part on the encryption request. The method may further include restricting access to the first record group during the encryption process of the first record group, and restoring access to the first record group upon completion of the encryption process of the first record group.

An apparatus for encryption management is described. The apparatus may include a processor, memory in electronic communication with the processor, and instructions stored in the memory. The instructions may be operable to cause the processor to receive, at a database server, an encryption request to perform an encryption process on a set of records stored at the database server, partition the set of records into a plurality of record groups based at least in part on a default group size, and perform the encryption process on a first record group of the plurality of record groups based at least in part on the encryption request. The instructions may further be operable to cause the processor to restrict access to the first record group during the encryption process of the first record group, and restore access to the first record group upon completion of the encryption process of the first record group.

A non-transitory computer readable medium for encryption management is described. The non-transitory computer-readable medium may include instructions operable to cause a processor to receive, at a database server, an encryption request to perform an encryption process on a set of records stored at the database server, partition the set of records into a plurality of record groups based at least in part on a default group size, and perform the encryption process on a first record group of the plurality of record groups based at least in part on the encryption request. Additionally, the non-transitory computer-readable medium may include instructions further operable to cause the processor to restrict access to the first record group during the encryption process of the first record group, and restore access to the first record group upon completion of the encryption process of the first record group.

Some examples of the method, apparatus, and non-transitory computer-readable medium described above may further include processes, features, means, or instructions for transmitting an encryption status associated with the first record group to a user interface. Some examples of the method, apparatus, and non-transitory computer-readable medium described above may further include processes, features, means, or instructions for performing the encryption process on a second record group of the plurality of record groups based at least in part on the encryption request, wherein the second record group may be different from the first record group.

Some examples of the method, apparatus, and non-transitory computer-readable medium described above may further include processes, features, means, or instructions for calculating a size of each of the plurality of record groups and a total size of the plurality of record groups. Some examples of the method, apparatus, and non-transitory computer-readable medium described above may further include processes, features, means, or instructions for determining to perform the encryption process on the plurality of record groups if the total size of the plurality of record groups may be less than a threshold size.

In some examples of the method, apparatus, and non-transitory computer-readable medium described above, the size of a record group comprises a number of records associated with the record group. In some examples of the method, apparatus, and non-transitory computer-readable medium described above, the total size of the plurality of record groups comprises a number of record groups for performing the encryption process based at least in part on the encryption request, a total number of records associated with the plurality of record groups, or both.

Some examples of the method, apparatus, and non-transitory computer-readable medium described above may further include processes, features, means, or instructions for dynamically determining a size range for the plurality of record groups based at least in part on the default group size, wherein the size of each of the plurality of record groups may be within the size range.

Some examples of the method, apparatus, and non-transitory computer-readable medium described above may further include processes, features, means, or instructions for refraining from updating one or more data modification timestamps associated with the first record group.

Some examples of the method, apparatus, and non-transitory computer-readable medium described above may further include processes, features, means, or instructions for determining an estimated processing time associated with the encryption process. Some examples of the method, apparatus, and non-transitory computer-readable medium described above may further include processes, features, means, or instructions for transmitting an indication of the estimated processing time to a user interface.

Some examples of the method, apparatus, and non-transitory computer-readable medium described above may further include processes, features, means, or instructions for determining whether the estimated processing time may be above a processing time threshold, wherein the indication of the estimated processing time comprises an indication of whether the estimated processing time may be above the processing time threshold.

Some examples of the method, apparatus, and non-transitory computer-readable medium described above may further include processes, features, means, or instructions for determining an estimated amount of resources associated with the encryption process. Some examples of the method, apparatus, and non-transitory computer-readable medium described above may further include processes, features, means, or instructions for transmitting an indication of the estimated amount of resources to a user interface.

Some examples of the method, apparatus, and non-transitory computer-readable medium described above may further include processes, features, means, or instructions for determining an encryption status associated with each record of the set of records. Some examples of the method, apparatus, and non-transitory computer-readable medium described above may further include processes, features, means, or instructions for transmitting an indication of the determined encryption statuses to a user interface.

In some examples of the method, apparatus, and non-transitory computer-readable medium described above, the indication of the determined encryption statuses comprises a ratio of encrypted records to non-encrypted records, a ratio of records encrypted with a first encryption key to records encrypted with a second encryption key, a ratio of records encrypted using a first encryption scheme to records encrypted using a second encryption scheme, a total number of encrypted records, a total number of records encrypted using a revoked encryption key, or a combination thereof.

Some examples of the method, apparatus, and non-transitory computer-readable medium described above may further include processes, features, means, or instructions for receiving, from a user, a request to access a record of the set of records. Some examples of the method, apparatus, and non-transitory computer-readable medium described above may further include processes, features, means, or instructions for identifying that the record may be included in the first record group. Some examples of the method, apparatus, and non-transitory computer-readable medium described above may further include processes, features, means, or instructions for transmitting, to a user interface, an indication that access may be restricted to the record based at least in part on restricting access to the first record group and the identification.

Some examples of the method, apparatus, and non-transitory computer-readable medium described above may further include processes, features, means, or instructions for identifying an encrypted record of the set of records encrypted using a revoked encryption key. Some examples of the method, apparatus, and non-transitory computer-readable medium described above may further include processes, features, means, or instructions for transmitting an indication of the encrypted record to a user interface.

In some examples of the method, apparatus, and non-transitory computer-readable medium described above, the default group size may be based at least in part on a tenant identifier, a user input, or a combination thereof. In some examples of the method, apparatus, and non-transitory computer-readable medium described above, the encryption process on the first record group comprises a mass encryption process, a mass decryption process, a mass key rotation process, an encryption scheme modification, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for encryption management, comprising:
receiving, at a database server, an encryption request to perform an encryption process on a set of records stored at the database server;
partitioning the set of records into a plurality of record groups based at least in part on a default group size;
performing the encryption process on a first record group of the plurality of record groups based at least in part on the encryption request;
refraining from updating one or more data modification timestamps associated with the first record group;
restricting access to the first record group during the encryption process of the first record group; and
restoring access to the first record group upon completion of the encryption process of the first record group.

2. The method of claim 1, further comprising:
transmitting an encryption status associated with the first record group to a user interface; and
performing the encryption process on a second record group of the plurality of record groups based at least in part on the encryption request, wherein the second record group is different from the first record group.

3. The method of claim 1, further comprising:
calculating a size of each of the plurality of record groups and a total size of the plurality of record groups; and
determining to perform the encryption process on the plurality of record groups if the total size of the plurality of record groups is less than a threshold size.

4. The method of claim 3, wherein:
the size of a record group comprises a number of records associated with the record group; and
the total size of the plurality of record groups comprises a number of record groups for performing the encryption process based at least in part on the encryption request, a total number of records associated with the plurality of record groups, or both.

5. The method of claim 3, further comprising:
dynamically determining a size range for the plurality of record groups based at least in part on the default group size, wherein the size of each of the plurality of record groups is within the size range.

6. The method of claim 1, further comprising:
determining an estimated processing time associated with the encryption process; and
transmitting an indication of the estimated processing time to a user interface.

7. The method of claim 6, further comprising:
determining whether the estimated processing time is above a processing time threshold, wherein the indication of the estimated processing time comprises an indication of whether the estimated processing time is above the processing time threshold.

8. The method of claim 1, further comprising:
determining an estimated amount of resources associated with the encryption process; and
transmitting an indication of the estimated amount of resources to a user interface.

9. The method of claim 1, further comprising:
determining an encryption status associated with each record of the set of records; and
transmitting an indication of the determined encryption statuses to a user interface.

10. The method of claim 9, wherein the indication of the determined encryption statuses comprises a ratio of encrypted records to non-encrypted records, a ratio of records encrypted with a first encryption key to records encrypted with a second encryption key, a ratio of records encrypted using a first encryption scheme to records encrypted using a second encryption scheme, a total number of encrypted records, a total number of records encrypted using a revoked encryption key, or a combination thereof.

11. The method of claim 1, further comprising:
receiving, from a user, a request to access a record of the set of records;
identifying that the record is included in the first record group; and
transmitting, to a user interface, an indication that access is restricted to the record based at least in part on restricting access to the first record group and the identification.

12. The method of claim 1, further comprising:
identifying an encrypted record of the set of records encrypted using a revoked encryption key; and
transmitting an indication of the encrypted record to a user interface.

13. The method of claim 1, wherein the default group size is based at least in part on a tenant identifier, a user input, or a combination thereof.

14. The method of claim 1, wherein the encryption process on the first record group comprises a mass encryption process, a mass decryption process, a mass key rotation process, an encryption scheme modification, or a combination thereof.

15. An apparatus for encryption management, comprising:
a processor;
memory in electronic communication with the processor; and
instructions stored in the memory and operable, when executed by the processor, to cause the apparatus to:
receive, at a database server, an encryption request to perform an encryption process on a set of records stored at the database server;
partition the set of records into a plurality of record groups based at least in part on a default group size;
perform the encryption process on a first record group of the plurality of record groups based at least in part on the encryption request;
refrain from updating one or more data modification timestamps associated with the first record group;
restrict access to the first record group during the encryption process of the first record group; and
restore access to the first record group upon completion of the encryption process of the first record group.

16. The apparatus of claim 15, wherein the instructions are further executable by the processor to:
transmit an encryption status associated with the first record group to a user interface; and
perform the encryption process on a second record group of the plurality of record groups based at least in part on the encryption request, wherein the second record group is different from the first record group.

17. The apparatus of claim 15, wherein the instructions are further executable by the processor to:
calculate a size of each of the plurality of record groups and a total size of the plurality of record groups; and
determine to perform the encryption process on the plurality of record groups if the total size of the plurality of record groups is less than a threshold size.

18. A non-transitory computer readable medium storing code for encryption management, the code comprising instructions executable by a processor to:
receive, at a database server, an encryption request to perform an encryption process on a set of records stored at the database server;
partition the set of records into a plurality of record groups based at least in part on a default group size;
perform the encryption process on a first record group of the plurality of record groups based at least in part on the encryption request;
refrain from updating one or more data modification timestamps associated with the first record group;
restrict access to the first record group during the encryption process of the first record group; and
restore access to the first record group upon completion of the encryption process of the first record group.

19. The non-transitory computer-readable medium of claim 18, wherein the instructions are further executable by the processor to:
transmit an encryption status associated with the first record group to a user interface; and
perform the encryption process on a second record group of the plurality of record groups based at least in part on the encryption request, wherein the second record group is different from the first record group.

* * * * *